US010726313B2

(12) United States Patent
Lee et al.

(10) Patent No.: US 10,726,313 B2
(45) Date of Patent: Jul. 28, 2020

(54) ACTIVE LEARNING METHOD FOR TEMPORAL ACTION LOCALIZATION IN UNTRIMMED VIDEOS

(71) Applicant: Adobe Inc., San Jose, CA (US)

(72) Inventors: Joon-Young Lee, Milpitas, CA (US); Hailin Jin, San Jose, CA (US); Fabian David Caba Heilbron, Thuwal (SA)

(73) Assignee: Adobe Inc., San Jose, CA (US)

( * ) Notice: Subject to any disclaimer, the term of this patent is extended or adjusted under 35 U.S.C. 154(b) by 126 days.

(21) Appl. No.: 15/957,419

(22) Filed: Apr. 19, 2018

(65) Prior Publication Data

US 2019/0325275 A1   Oct. 24, 2019

(51) Int. Cl.
    *G06K 9/00*   (2006.01)
    *G06K 9/66*   (2006.01)
    *G06N 3/08*   (2006.01)
    *G06K 9/62*   (2006.01)
    *G06N 3/04*   (2006.01)

(52) U.S. Cl.
    CPC .......... *G06K 9/66* (2013.01); *G06K 9/00718* (2013.01); *G06K 9/00765* (2013.01); *G06K 9/6267* (2013.01); *G06N 3/0454* (2013.01); *G06N 3/08* (2013.01)

(58) Field of Classification Search
    CPC .. G06K 9/66; G06K 9/00718; G06K 9/00765; G06K 9/6267; G06N 3/0454; G06N 3/08
    See application file for complete search history.

(56) References Cited

U.S. PATENT DOCUMENTS

2018/0373980 A1* 12/2018 Huval ...................... G06N 3/08
2019/0122077 A1*  4/2019 Tsishkou .............. G06N 3/0454

OTHER PUBLICATIONS

Cortes, Corinna, et al., "Support-Vector Networks", Machine Learning, 20(3), Kluwer Academic Publishers, Sep. 1995, 25 pages.
Kay, Will, et al., "The Kinetics Human Action Video Dataset", arXiv preprint arXiv:1705.06950, May 2017, 22 pages.
Konyushkova, Ksenia, et al., "Learning Active Learning From Data", Advances in Neural Information Processing Systems, 2017, 11 pages.
Bachman, Phillip, et al., "Learning Algorithms for Active Learning", arXiv preprint arXiv:1708.00088, Jul. 2017, 10 pages.

(Continued)

*Primary Examiner* — Ping Y Hsieh
(74) *Attorney, Agent, or Firm* — Kilpatrick Townsend & Stockton LLP

(57) ABSTRACT

Various embodiments describe active learning methods for training temporal action localization models used to localize actions in untrimmed videos. A trainable active learning selection function is used to select unlabeled samples that can improve the temporal action localization model the most. The select unlabeled samples are then annotated and used to retrain the temporal action localization model. In some embodiment, the trainable active learning selection function includes a trainable performance prediction model that maps a video sample and a temporal action localization model to a predicted performance improvement for the temporal action localization model.

20 Claims, 11 Drawing Sheets

(56) References Cited

OTHER PUBLICATIONS

Bandla, Sunil, et al., "Active Learning of an Action Detector From Untrimmed Videos", IEEE International Conference on Computer Vision (ICCV), 2013, 2 pages.

Brinker, Klaus, "Incorporating Diversity in Active Learning With Support Vector Machines", International Conference on Machine Learning (ICML), 2003, 8 pages.

Buch, Shyamul, et al., "End-To-End, Single-Stream Temporal Action Detection in Untrimmed Videos", British Machine Vision Conference (BMVC), 2017, 12 pages.

Heilbron, F. Caba, et al., "ActivityNet: A Large-Scale Video Benchmark for Human Activity Understanding", Computer Vision and Pattern Recognition (CVPR), Oct. 2015, 1 page.

Heilbron, F. Caba, et al., "Collecting and Annotating Human Activities in Web Videos", Proceedings of International Conference on Multimedia Retrieval (ICMR), Apr. 2014, 2 pages.

Carreira, Joao, et al., "Quo Vadis, Action Recognition? A New Model and the Kinetics Dataset", CVPR, 2017, 10 pages.

Cisco, "The Zettabyte Era: Trends and Analysis", available at https://www.cisco.com/c/en/us/solutions/collateral/service-provider/visual-networking-index-vni/vni-hyperconnectivity-wp.html, 2017, 32 pages.

Collins, Brendan, et al., "Towards Scalable Dataset Construction: An Active Learning Approach", European Conference on Computer Vision (ECCV), 2008, 14 pages.

Cronin, Leroy, et al., "Human Vs Robots in the Discovery and Crystallization of Gigantic Polyoxometalates", Angewandte Chemie, 2017, 6 pages.

Duchenne, Oliver, et al., "Automatic Annotation of Human Actions in Video", IEEE International Conference on Computer Vision (ICCV), 2009, 8 pages.

Escorcia, Victor, et al., "Daps: Deep Action Proposals for Action Understanding", ECCV, 2016, 17 pages.

Fan, Rong-En, et al, "Liblinear: A Library for Large Linear Classification", Journal of Machine Learning Research, No. 8, Aug. 2008, 30 pages.

Gaidon Adrien, et al., "Actom Sequence Models for Efficient Action Detection", IEEE Conference on Computer vision & Pattern, Jun. 2011, 8 pages.

Gao, Jiyang, et al., "Turn Tap: Temporal Unit Regression Network for Temporal Action Proposals", IEEE ICCV, 2017, 9 pages.

Gilad-Bachrach, Ran, et al., "Query by Committee Made Real", Conference on Neural Information Processing Systems (NIPS), 2006, 8 pages.

Gkioxari, Georgia, et al., "R-CNNs for Pose Estimation and Action Detection", arXiv:1406.5212v1, Jun. 2014, 8 pages.

Gkioxari, Georgia, et al., "Finding Action Tubes", CVPR, 2015, 10 pages.

Goodfellow, Ian, J., et al., "Explaining and Harnessing Adversarial Examples", International Conference on Learning Representations (ICLR), 2014 (arXiv:1412.6572v3, Mar. 2015), 11 pages.

Hakkani-Tur, Dilek, et al., "Active Learning for Automatic Speech Recognition", 2002 IEEE International Conference on Acoustics, Speech, and Signal Processing (ICASSP), 2002, 4 pages.

Jain, Mihir, et al., "Action Localization With Tubelets From Motion", CVPR, 2014, 8 pages.

Jiang, Y.-G., et al., "THUMOS challenge: Action recognition with a large number of classes", http://crcv.ucf.edu/THUMOS14, 2014, 5 pages.

Joshi, Ajay J., et al., "Multi-Class Active Learning for Image Classification," CVPR, Aug. 2009, 2 pages.

Kapoor, Ashish, et al., "Active Learning With Gaussian Processes for Object Categorization", ICCV, Oct. 2007, 8 pages.

Karpathy, Andrej, et al., "Large-Scale Video Classification With Convolutional Neural Networks", CVPR, 2014, 8 pages.

Konyushkova, Ksenia, et al., "Learning Active Learning From Real and Synthetic Data", arXiv preprint arXiv:1703.03365v2, Mar. 2017, 11 pages.

Lewis, David D., et al., "Heterogeneous Uncertainty Sampling for Supervised Learning", ICML, 1994, 9 pages.

Lewis, David D., et al., "A Sequential Algorithm for Training Text Classifiers", In Proceedings of the 17th annual international ACM SIGIR conference on Research and development in information retrieval, Jul. 1994, 10 pages.

Lin, Xiao, et al., "Active Learning for Visual Question Answering: An Empirical Study", arXiv preprint arXiv:1711.01732, Nov. 2017, 23 pages.

Buyu, Liu, et al., "Active Learning for Human Pose Estimation", ICCV, 2017, 10 pages.

Maji, Subhransu, et al., "Action recognition from a distributed representation of pose and appearance", In CVPR, Jun. 2011, 8 pages.

Mehran, Ramin, et al., "Abnormal Crowd Behavior Detection Using Social Force Model", CVPR, 2009, 8 pages.

Oneata, Dan, et al., "Efficient Action Localization With Approximately Normalized Fisher Vectors", CVPR, 2014, 8 pages.

Platt, John, et al., "Probabilistic outputs for support vector machines and comparisons to regularized likelihood methods", Advances in Large Margin Classifiers, 10(3), Mar. 1999, 11 pages.

Poppe, Ronald, "A Survey on Vision-Based Human Action Recognition", Image and Vision Computing, 28(6), 2010, 15 pages.

Qi, Guo-Jun, et al., "Two-Dimensional Active Learning for Image Classification", CVPR, 2008, 8 pages.

Russakovsky, Olga, et al., "ImageNet Large Scale Visual Recognition Challenge", International Journal of Computer Vision, 115(3), 2015, 43 pages.

Settles, Burr, "Active Learning Literature Survey", University of Wisconsin, Madison, 52(55-66):11, Jan. 2010, 67 pages.

Shou, Zheng, et al., "Temporal Action Localization in Untrimmed Videos Via Multi-Stage CNNs", CVPR, 2016, 10 pages.

Sigurdsson, G. A., et al., "Much Ado About Time: Exhaustive Annotation of Temporal Data", AAAI Conference on Human Computation and Crowdsourcing (HCOMP), arXiv:1607.07429v2, Oct. 2016, 11 pages.

Sigurdsson, G. A., et al., "Hollywood in Homes: Crowdsourcing Data Collection for Activity Understanding", ECCV, 2016 (arXiv:1604.01753v3, Jul. 2016), 17 pages.

Simonyan, Karen, et al., "Two-Stream Convolutional Networks for Action Recognition in Videos", NIPS, 2014, 9 pages.

Szegedy, Christian, et al., "Rethinking the Inception Architecture for Computer Vision", CVPR, 2016, 9 pages.

Thompson, Cynthia A., et al., "Active learning for natural language parsing and information extraction", Proceedings of the Sixteenth International Learning Conference, Jun. 1999, 9 pages.

Tong, Simon, et al., "Support Vector Machine Active Learning for Image Retrieval", Proceedings of the ninth ACM international conference on Multimedia, ACM, 2001, 12 pages.

Vijayanarasimhan, Sudheendra, et al., "Large-Scale Live Active Learning: Training Object Detectors With Crawled Data and Crowds", International Journal of Computer Vision, 108(1-2), 2014, 8 pages.

Vondrick, Carl, et al., "Efficiently scaling up crowdsourced video annotation", International Journal of Computer Vision, Jun. 2012, 22 pages.

Vondrick, Carl, et al., Video Annotation and Tracking With Active Learning, NIPS, 2011, 9 pages.

Wang, Limin, et al, "Untrimmednets for Weakly Supervised Action Recognition and Detection", CVPR, 2017 (arXiv:1703.033292v2, May 2017), 10 pages.

Weinzaepfel, Philippe, et al., "Learning to Track for Spatio-Temporal Action Localization", ICCV, 2015, 9 pages.

Woodward, Mark, et al., "Active One-Shot Learning", NIPS, 2016, 8 pages.

Xu, Huijuan, et al., "R-C3D: Region Convolutional 3D Network for Temporal Activity Detection", ICCV, 2017, 10 pages.

Yan, Rong, et al, "Automatically Labeling Video Data Using Multiclass Active Learning", ICCV, 2003, 8 pages.

Yao, Bangpeng, et al., "Human Action Recognition by Learning Bases of Action Attributes and Parts", ICCV, 2011, 11 pages.

Yeung, Serena, et al., "Learning to Learn From Noisy Web Videos", CVPR, 2017, 9 pages.

(56) References Cited

OTHER PUBLICATIONS

Yeung, Serena, et al., "End-To-End Learning of Action Detection From Frame Glimpses in Videos", CVPR, 2016, 10 pages.
Yilmaz, Alper, et al., "Object tracking: A survey", ACM Computing Surveys (CSUR), 38(4):13, 2006, 45 pages.
Zhao, Yue, et al., "Temporal Action Detection With Structured Segment Networks", ICCV, 2017, 10 pages.

\* cited by examiner

700

For each of one or more training sample partitions (into first subset and second subset) and each of one or more initializations:

> Train a model (e.g., temporal action localization model) using the first subset of training samples to generate an initial model
> 710

For each training sample selected from the second subset of training samples:

> Describe the training sample selected from the second subset (e.g., using histogram)
> 720
>
> Retrain the model using the first subset and the training sample selected from the second subset
> 730
>
> Determine the performance of the retrained model on a set of test samples
> 740
>
> Determine the performance improvement of the retrained model over the initial model
> 750

Generate a performance prediction model mapping the initial model and the description of the selected training sample to the performance improvement
760

Determine a selection function that selects an unlabeled sample with the most improvement to an existing model from a set of unlabeled samples based on the performance prediction model and the existing model
770

*FIG. 7*

ACTIVE LEARNING METHOD FOR TEMPORAL ACTION LOCALIZATION IN UNTRIMMED VIDEOS

TECHNICAL FIELD

This application relates generally to machine learning-based temporal action localization in video streams.

BACKGROUND

With the enormous amount of video content generated or shared by people using various electronic devices (e.g., smart phones, digital cameras, and digital camcorders), there has been a pressing need to automatically discover semantic information, such as certain actions, from untrimmed videos for applications, such as video editing, video tagging, video searching, and video surveillance. For example, in many cases, the untrimmed videos may be long videos (e.g., surveillance videos) including multiple actions of interest (which can be relatively short) and background scenes or activities. Manually localizing the actions of interest in the long videos can be time consuming and costly. Temporal action localization techniques have begun to be used to automatically determine whether a video stream includes specific actions (e.g., human activities) and identify the temporal boundaries (e.g., starting time and end time) of each action.

Due to the rapid development in artificial neural network and machine learning in recent years, many temporal action localization techniques use models (e.g., neural networks) generated using machine learning techniques to recognize actions in videos and localize the starting time and end time of each action. However, many machine learning techniques require large amounts of training data to train the models. For example, for some supervised learning systems to perform well, hundreds, thousands, or more of labeled training samples are needed. However, in many circumstances, labeled training samples, in particular, labeled video training samples, are very difficult, time-consuming, and/or expensive to obtain. Without sufficient training data, a model may not be as accurate or robust as desired. As such, models generated for temporal action localization may not perform as well as other models, such as models for object detection from still images (the training data for which is generally sufficient), due to the limited available training samples. It is a challenging task to train a temporal action localization model using limited labeled training video samples.

SUMMARY

Embodiments of the present disclosure are directed to, among other things, techniques for temporal action localization in video streams using machine learning-based models. According to certain embodiments, an active learning technique for training temporal action localization models is disclosed. The active learning technique is used to select one or more unlabeled videos such that the performance of the temporal action localization model retrained using the selected one or more unlabeled videos can improve the most. In one embodiment, an active learning selection function is trained first, the trained active learning selection function is used to select one or more unlabeled samples that are predicted to improve the performance of the temporal action localization model the most, and the selected one or more unlabeled samples are then annotated and used to train the temporal action localization model. The process of unlabeled sample selection, annotation, and localization model training is performed recursively until an accurate and robust temporal action localization model is generated or until all unlabeled samples have been selected and annotated.

Techniques disclosed herein can be used to more efficiently train a temporal action localization model using limited available training samples and with a lower cost. Compared with learning techniques that conduct passive selection or select samples based on uncertainty sampling (e.g., based on entropy, confidence, or margin scores), techniques disclosed herein use an active learning selection function that is trainable to select samples that can improve the temporal action localization model the most. As a result, the disclosed active learning technique exhibits multiple selection behaviors, can be employed in batch mode, is steerable, is robust to noisy oracles, and can handle complex scenarios with noisy labels, outliers, or shift in data distribution. For instance, the active learning technique disclosed herein can potentially select simple examples when the training is at early learning stages, and can select more complex samples at later training stages after the model has been trained with a certain number of samples.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 1A illustrates a beginning of an example action instance in an example video stream. FIG. 1B illustrates an end of an example action instance in an example video stream.

FIG. 7 is a simplified flow chart illustrating an example method for training a selection function used in an active learning-based training process according to certain embodiments.

DETAILED DESCRIPTION

Figure 1A:
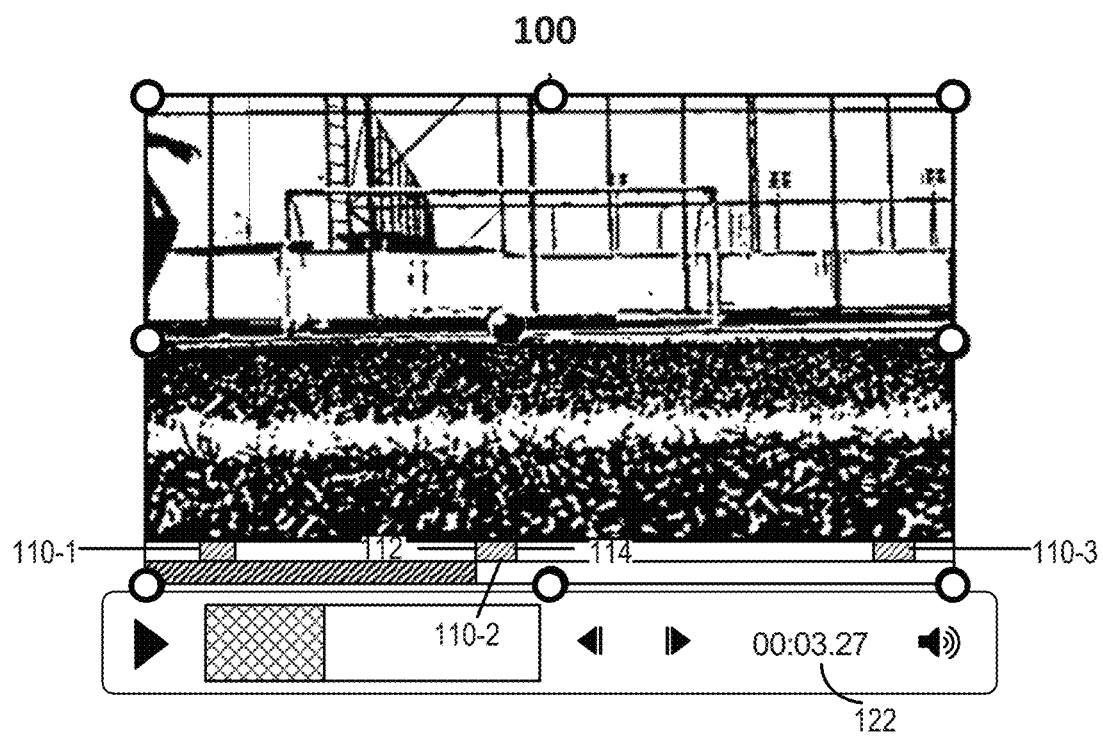
FIGS. 1A and 1B illustrate an example process of temporal action localization.

Techniques disclosed herein relate generally to temporal action localization in video streams. Some embodiments relate to active learning techniques for training a temporal action localization model (e.g., one that is implemented as a machine learning-based system, such as a neural network). One challenge in active learning is to define the proper selection function that can minimize or reduce the number of training samples used to reach a target performance. The active learning techniques disclosed herein select one or more unlabeled videos to be annotated for training from a set of unlabeled videos such that the performance of the temporal action localization model retrained using the selected one or more unlabeled videos (after annotation) can improve the most. In this way, the number of labeled training videos used to train an accurate and robust temporal action localization model can be reduced or minimized.

In some embodiments, the active learning techniques use a trainable selection function to select the next unlabeled video to be annotated for training. In one embodiment, a prediction function that maps parameters of a current localization model and features of a video to the performance improvement of a new localization model retrained using the video is determined first using, for example, regression techniques based on labeled videos. The prediction function is then used to predict the performance improvement over a current localization model for each potential new model that may be trained using a corresponding unlabeled video (if annotated for training) from a set of unlabeled videos. One or more unlabeled videos that cause the most improvement to the current localization model according to the prediction are selected and annotated. The annotated new video(s) can be added to the training video dataset for training an updated localization model. The prediction function can then be used to predict the performance improvement over the updated localization model for each potential new model that may be trained using a corresponding unlabeled video (if annotated for training) in the remaining unlabeled videos. One or more unlabeled samples that are predicted to improve the updated localization model the most can be annotated and used to retrain the updated localization model. The process of performance improvement prediction, unlabeled sample selection and annotation, and retraining can be performed recursively until an accurate and robust temporal action localization model is generated or until all unlabeled videos have been selected and annotated.

Compared with existing active learning techniques (e.g., passive selection or selection based on uncertainty sampling), techniques disclosed herein use an active learning selection function that is trainable to select samples that can improve the temporal action localization model the most. As a result, the techniques disclosed herein can be used to more efficiently and/or more accurately train a temporal action localization model based on limited available training samples at a lower cost. Thus, a video application (e.g., video surveillance for detecting actions) implementing a temporal action localization model trained using the active learning techniques disclosed herein can improve the accuracy of the application. As such, actions of interest and their corresponding timings can be automatically detected at a significantly higher precision and lower cost than what would have been possible with localization models trained using existing techniques. The techniques disclosed herein can also handle complex scenarios with noisy labels, outliers, or shift in data distribution. In addition, the selection function exhibits a flexible selection behavior, rather than a fixed behavior as in other active learning techniques, at different stages of the training process. For instance, the active learning techniques disclosed herein can potentially select simple video samples (e.g., videos with a single action or very few actions) at early learning stages, and can select more complex video samples (e.g., videos with multiple actions) at later learning stages after the model has been trained using a certain number of video samples.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Enormous amount of video data is generated and shared every day, thanks to the ubiquity of digital cameras and Internet applications such as social networks. Video data constitutes a large portion of Internet content. For example, more than 74% of total Internet traffic is video data. With the overwhelmingly large amount of video data available, a need to automatically understand and index such massive amounts of data has arisen. During the last decade, several techniques for video analysis have been proposed. One of the most challenging tasks in this field is to understand and temporally localize certain actions of interest (e.g., human activities) in untrimmed videos. Such tasks are often referred to as temporal action localization, which produces temporal bounds (e.g., starting and ending time instants) in a video during which certain actions of interest occur.

Tremendous progress has been made in temporal action localization in recent years at least in part due to the development and application of artificial neural networks and machine learning techniques. Datasets such as Thumos 14, ActivityNet, and Charades, have enabled the development of innovative techniques for temporal action localization. These techniques have improved localization performance while maintaining a relatively low computational complexity. Earlier methods rely on applying action classifiers in a sliding window fashion. To reduce the computational requirements of sliding windows, action proposals have been used to quickly scan a video to reduce the search space. However, despite the progress made, existing techniques still struggle to train accurate models with limited annotated data because of the dependence of machine learning models on a large amount of annotated training data. This dependence on training data often prevents the application of action localization techniques due to a large cost associated with video labeling. Additionally, because current datasets for temporal action localization are relatively small, models generated for temporal action localization using the limited dataset may not perform as well as other models, such as models for object detection from still images (the training data for which is generally sufficient). To overcome these limitations, techniques that combine video-level annotations and an attention mechanism have been used to perform temporal localization of actions in videos. Although such techniques do not require temporal ground-truth, their performance may be significantly lower than that achieved by fully-supervised techniques, and thus their applications have been limited to situations where very accurate detections are not required.

Active learning (also referred to as "query learning" or "optimal experimental design") techniques attempt to overcome the labeling bottleneck by intelligently selecting samples from unlabeled datasets to be annotated by an oracle. In this way, an active learner can achieve high accuracy using as few labeled samples as possible, thereby minimizing the cost of obtaining labeled training data. Several active learning strategies have been proposed and applied to various research fields, including speech recognition, natural language processing, and chemistry. Active learning has also been used in computer vision tasks, such as image classification and object detection, or to construct large-scale image and video datasets. Active learning techniques have also emerged in more contemporary vision tasks, including human pose estimation and visual question answering. Most of the active learning techniques in computer vision use the uncertainty sampling query strategy, where unlabeled samples are selected based on the entropy of their corresponding scores generated by the current model. For binary classification, entropy-based sample selection reduces to the least confidence or margin-based query strategies. Active learners using uncertainty sampling-based selection functions have been used to train a temporal action detector, which works well in controlled scenarios where statistical properties of the dataset can be inferred. However, the uncertainty sampling-based selection functions may not perform as well when more complex shifts in data distribution are present. For example, the uncertainty sampling query strategy may not be able to handle complex scenarios where factors, such as label noise, outliers, or shifts in data distribution, may arise in the active learning setting.

According to certain embodiments, active learning techniques are used to reduce the dependence of current temporal action localization methods on large scale training data. Instead of using predefined heuristics, the active learning techniques disclosed herein learn the active selection function from existing data to select samples (e.g., videos) to be annotated by an oracle for training from unlabeled datasets. In some implementations, a prediction function that maps a localization model-sample state pair to an expected improvement in performance of the localization model is learned from a labeled dataset. The prediction function is then used to predict the potential performance improvement if an unlabeled sample from an unlabeled sample dataset is annotated and used to retrain the localization model. One or more unlabeled samples are then selected from the unlabeled sample dataset based on the respective predicted performance improvement each unlabeled sample is likely to produce if the unlabeled sample is annotated and used to retrain the localization model. The active learning techniques disclosed herein are able to overcome the shortcomings of existing active learners, such as uncertainty sampling-based active learners. The trainable prediction function (and thus the trainable selection function) not only improves the learning process of an action localization model on a given dataset but also can be used to annotate new samples to be added to a dataset for temporal action localization or other video applications as described in detail below.

Figure 1B:
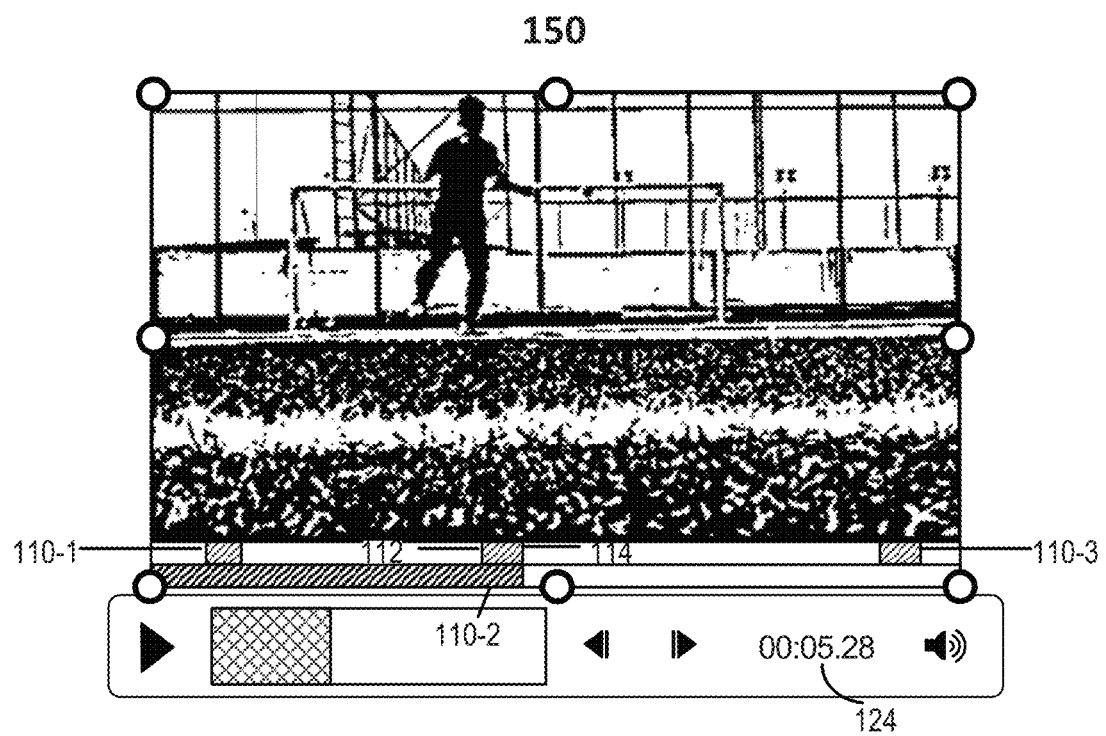

FIGS. 1A and 1B illustrate an example process of temporal action localization. FIG. 1A illustrates a beginning of an example action instance in an example video stream. As indicated in FIG. 1A, the video stream shown in FIG. 1A includes 3 action instances 110-1, 110-2, and 110-3. Each action instance includes an action of interest, such as a person kicking a soccer ball. Each action instance lasts a certain amount of time. For example, action instance 110-2 has an associated starting time 112 and end time 114. FIG. 1A shows a video frame 100, which is a video frame at starting time 112 of action instance 110-2. The actual time of starting time 112 of action instance 110-2 is indicated by a timer value 122. FIG. 1B illustrates an end of an example action instance 110-2 in the example video stream. FIG. 1B shows a video frame 150, which is a video frame at end time 114 of action instance 110-2. The actual time of end time 114 of action instance 110-2 is indicated by a timer value 124. The goal of temporal action localization is to identify actions of interest (e.g., action instances 110-1, 110-2, and 110-3) occurring in the video (e.g., an untrimmed video) and the starting and end times of the actions, such as starting time 112 and end time 114 of action instance 110-2.

As described above, the temporal action localization in untrimmed video can be performed using neural networks that can be trained using machine learning techniques based on labeled training video samples. As used herein, the term "neural network" refers to one or more computer-implemented networks capable of being trained to achieve a goal. Unless otherwise indicated, references herein to a neural network include one neural network or multiple interrelated neural networks that are trained together. In some cases, a neural network (or a component of a neural network) produces output data, such as segmentation data, data indicating image features, classification data, or other suitable types of data. Examples of neural networks include, without limitation, convolutional neural networks (CNNs), recurrent neural networks (RNNs), fully-connected neural networks, encoder neural networks (e.g., "encoders"), decoder neural networks (e.g., "decoders"), dense-connection neural networks, and other types of neural networks. In some embodiments, a neural network can be implemented using special hardware (e.g., GPU, tensor processing units (TPUs), or processing element arrays (PE arrays)), using software code and a general purpose processor, or a combination of special hardware and software code.

Figure 2:
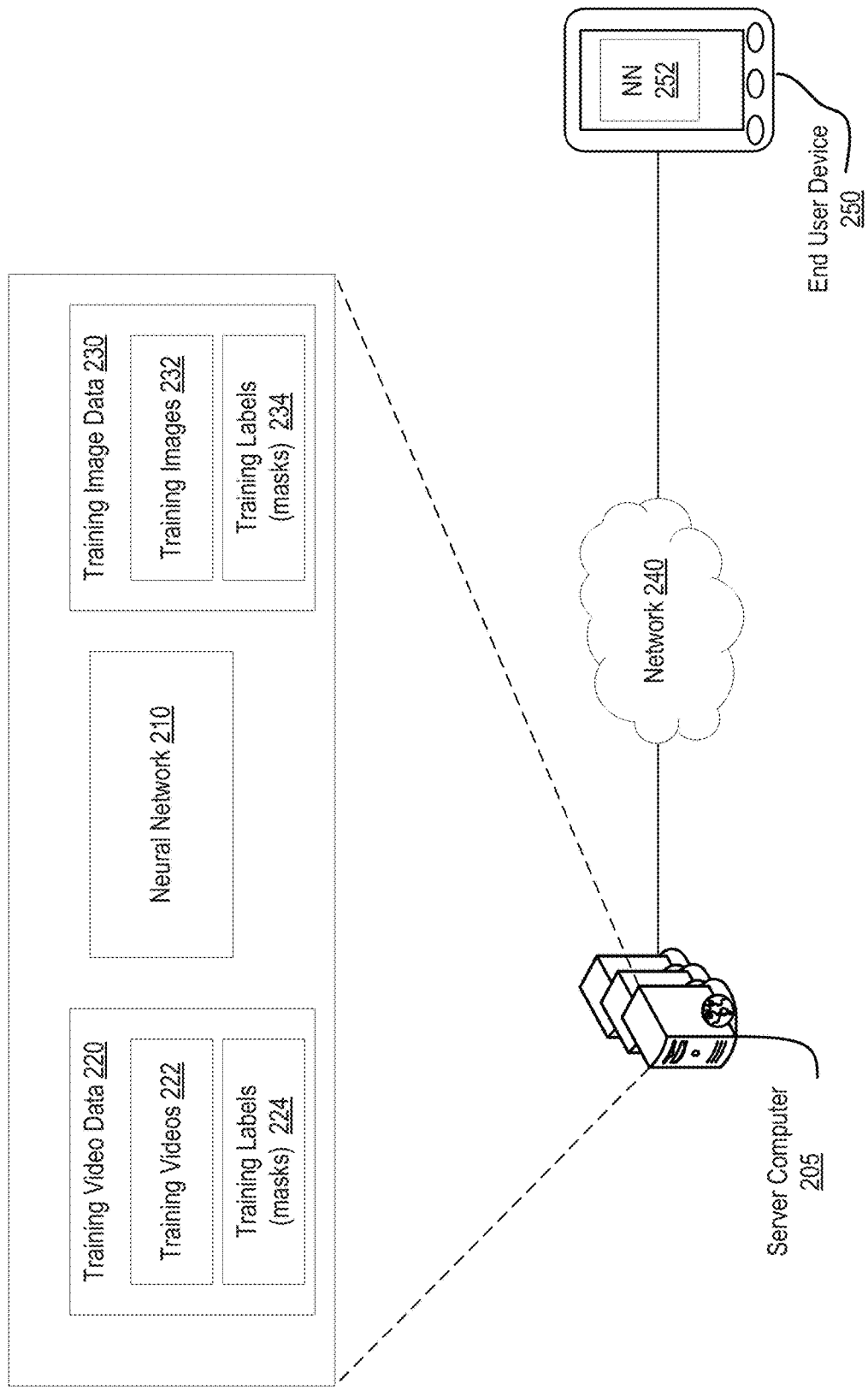
FIG. 2 illustrates an example computer system for performing temporal action localization using a neural network according to certain embodiments.

FIG. 2 illustrates an example computer system 200 for performing temporal action localization using an example neural network 210 according to certain embodiments. As illustrated, example computer system 200 includes a server computer 205 and an end user device 250. Generally, server computer 205 can be operated to train neural network 210. Once trained, neural network 210 is available for use by end user device 250 in support of different video-related applications hosted on end user device 250, such as video analysis, editing, and searching applications.

In an example, server computer 205 stores training video data 220. In some embodiments, training video data 220 includes training videos 222 and training labels 224. A training video represents a video from a collection of videos available for training neural network 210. A training label 224 is associated with a training video or a frame of the training video and indicates certain attributes of the training video. For example, the training label may be a class of an action occurred in a video and/or times associated with the action. The training label can be stored in, for example, the metadata of the training video or an additional channel (e.g., in addition to the red (R), green (G), and blue (B) channels) of the training video. The process of generating training videos 222 and training labels 224 may be time consuming and costly. In some implementations, public training datasets, such as the ActivityNet training dataset, may be used for training neural network 210. However, as discussed above, the public training datasets may be very limited.

In some embodiments, server computer 205 stores training image data 230. Training image data 230 includes training images 232 and training labels 234 (e.g., action annotations). A training image 232 represents a frame of a video. A training label 234 is associated with a training image 232 and indicates certain attributes of the training image. In one example, the training label includes the class of an action in a training image. The training label can be stored in, for example, the metadata of the training image or an additional channel (e.g., in addition to the red (R), green (G), and blue (B) channels) of the training image. In some implementations, training image data 230 includes synthesized training images and labels that are generated from static images through, for example, transformations (e.g., rotation, scaling, color perturbation, etc.) and/or combinations (e.g., cropping, blending, etc.)

Based on training video data 220 and/or training image data 230, server computer 205 can train neural network 210 to determine parameters of neural network 210, such as weights or filters of various convolutional layers or fully connected network layers. The parameters of neural network 210 can be determined by, for example, back propagation of errors or loss values between action localization results for a training video generated by neural network 210 and the ground-truth labels of the training video. Example methods for training neural network 210 are described in detail below.

In some embodiments, end user device 250 communicates with server computer 205 over a network 240, such as one involving the Internet. Once trained, neural network 210 can be downloaded to end user device 250 (shown as an instance 252 of neural network 210 on end user device 250 in FIG. 2) from server computer 205. Updates to neural network 210 can be pushed or pulled from server computer 205 to end user device 250. Additionally or alternatively, end user device 250 may not download neural network 210. Rather, when temporal action localization is to be performed on an untrimmed target video to identify and localize actions of interest, end user device 250 sends a request or a call (e.g., an application programming interface (API) call) over network 240 to server computer 205, which performs the requested temporal action localization of the target video. Server computer 205 then sends a response, such as the starting and end times of identified actions, video annotated with labels indicating the starting and end times and the classes of the identified actions, or a link to annotated video, over network 240 back to end user device 250.

In some implementations, end user device 250 and server computer 205 can be combined to perform the model training and/or temporal action localization operations. In one example, server computer 205 is used to learn a trainable selection function for an active learner, and end user device 250 uses the trained selection function from server computer 205 to select unlabeled video samples and train the localization model after the selected unlabeled video samples are annotated by an oracle (e.g., by a person manually or by a computing system with the confirmation by a person). In another example, server computer 205 is used to train the selection function and select unlabeled video samples, which are then annotated and sent to end user device 250 for training the localization model. In another example, end user device 250 and server computer 205 are combined to perform the temporal action localization using a trained localization model. The operations of model training and/or temporal action localization can be distributed between end user device 250 and server computer 205 in many different ways.

Figure 3:
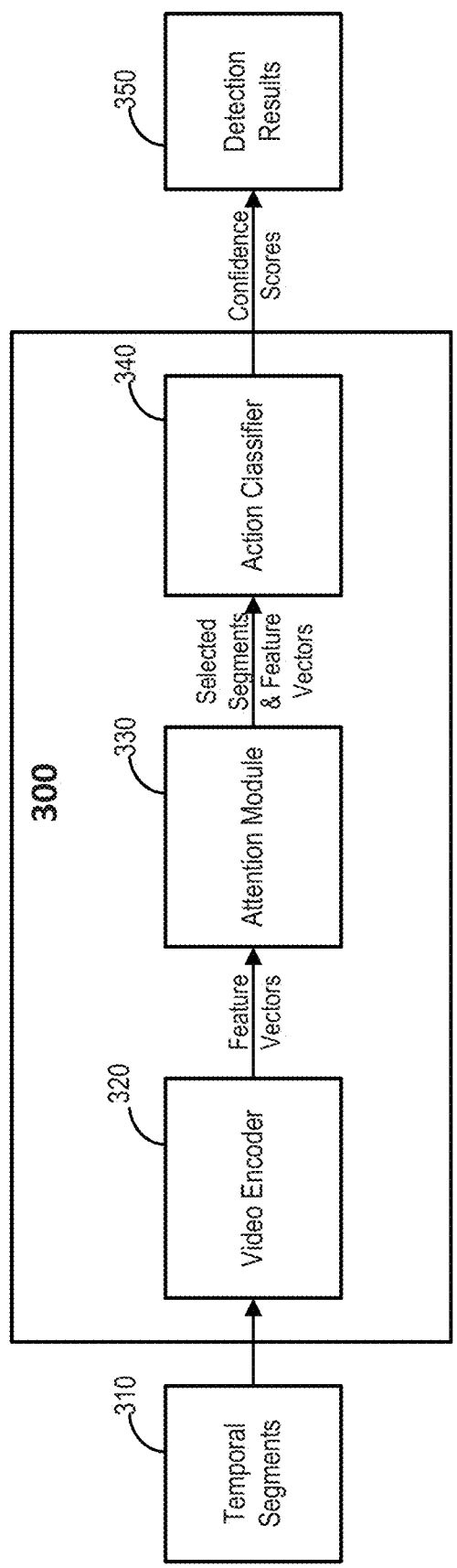
FIG. 3 is a simplified block diagram of an example temporal action localization system for identifying temporal locations of actions in video streams according to certain embodiments.

FIG. 3 is a simplified block diagram of an example temporal action localization system 300 for identifying temporal locations of actions in video streams according to certain embodiments. Temporal action localization system 300 is an example implementation of a temporal action localization model. In some embodiments, temporal action localization system 300 is implemented using a neural network as described above with respect to FIG. 2. In the example shown in FIG. 3, temporal action localization system 300 includes a video encoder 320, an attention module 330, and an action classifier 340. Temporal action localization system 300 receives temporal segments 310 of an untrimmed video v and generates detection results 350 for the untrimmed video.

Temporal segments 310 of untrimmed video v include a set of n temporal segments, denoted by $S=\{s_1, s_2, \ldots, s_n\}$, where $s_i=[t_i^{start}, t_i^{start}]$ is a vector including the starting and ending times of a temporal segment and $i=1, 2, \ldots, n$. In some implementations, temporal segments 310 are action proposals generated using the deep action proposals (DAPs) technique. Details of the DAPs technique are described in, for example, Escorcia et al., "DAPs: Deep Action Proposals for Action Understanding," ECCV 2016. Temporal action localization system 300 selects k temporal segments $S^k$ from temporal segments 310 (S) and produces a vector of confidence scores $z_c \in \mathbb{R}^k$ for each action class c in a set of action classes C. In other words, temporal action localization system 300 maps an input video described by a large set (e.g., n) of candidate temporal segments into a small set (e.g., k) of temporal predictions: $ft(\mathcal{V}, S) \rightarrow \{S^k, \{z_c\}_{c \in C}\}$.

Video encoder 320 is used to extract feature vectors from temporal segments 310. In one example, video encoder 320 describes temporal segments 310 (S) in terms of a feature vector (e.g., a matrix of visual observations) O. Video encoder 320 is used to encode each individual segment $s_i$ with a compact representation. In some implementations, frame-level features for each temporal segment $s_i$ are extracted using a CNN and then aggregated into a single feature vector $o_i$. Thus, in some implementations, for the n temporal segments, video encoder 320 can generate a matrix of visual observations $O=[o_1, o_2, \ldots, o_n] \in \mathbb{R}^{2048 \times n}$. In one example, an Inception V3 network (see, e.g., Szegedy et al., "*Rethinking the inception architecture for computer vision,*" CVPR, 2016) is used as the video encoder and is trained using the Kinetics dataset (see, e.g., Kay et al., "*The kinetics human action video dataset,*" arXiv: 1705.06950, 2017), where features (e.g., a feature vector with a dimension of 2048) are extracted from the pool3 layer. To reduce the temporal receptive field, average pooling may be used. Average pooling has demonstrated competitive performance in various tasks in addition to its simplicity.

Attention module 330 selects k segments from the n temporal segments using a classifier $h_r$. In one example implementation, attention module 330 receives the matrix of visual observation O generated by video encoder 320, and picks k temporal segments $S^k$ that are most likely to include an action. In some implementations, a linear Support Vector Machine (SVM) classifier is used to discriminate between actions and background scenes. In some implementations, Platt scaling (see, e.g., Platt et al., "Probabilistic outputs for support vector machines and comparisons to regularized likelihood methods," Advances in large margin classifiers, 10(3):61-74, 1999) is used to obtain probabilistic scores from the outputs of the SVM classifier. In some implementations, to select the k segments, hard attention pooling is performed and the top-k segments with the highest confidence scores are selected. k can be a small number, such as 10. As a result, attention module 330 (represented by $h_r$) outputs a small number of segments $S^k$ that are encoded with their corresponding visual representations in the matrix of visual observation O.

Action classifier 340 ($\phi(S^k)$) generates the confidence scores $z_c$ for each class c in the set of action classes C using the reduced set of temporal segments $S^k$. In one implementation, a neural network including a fully-connected layer and a Softmax classifier is used for the action classifier. The final detection results can be represented by $\{S^k, \{z_c\}_{c \in C}\}$.

Temporal action localization system 300 can be trained using labeled video samples. A training dataset $L_t$ including $p_t$ labeled training video samples can be represented by $L_t = \{(v_1^{train}, y_1), (v_2^{train}, y_2), \ldots, (v_{p_t}^{train}, y_{p_t})\}$ at learning step t, where $Y = [y_1 | y_2 | \ldots | y_{p_t}] \in \mathbb{R}^{2 \times p_t}$ includes the temporal annotations of action instances. The set of temporal segments for each labeled training video sample can be described as $S_i^{(t)} = \{S_1^{train}, S_2^{train}, \ldots, S_m^{train}\}$, where $i \in \{1, 2, \ldots, p_t\}$ and m is the number of temporal segments in a labeled video sample. In some implementations, attention module 330 and action classifier 340 are trained separately. To train attention module 330, temporal segments in $S_i^{(t)}$ are defined as true positives if the temporal Intersection over Union (tIoU) with any ground-truth instance is greater than, for example, 0.7. The tIoU represents the ratio of the overlapped time period between a time window that is identified as associated with an action and the ground-truth time window associated with the action over the combined time period of the identified time window and the ground-truth time window. Similarly, to train action classifier 340, temporal segments with tIoU greater than, for example, 0.7, are defined as positive, and only the top k segments selected by attention module 330 are classified by action classifier 340.

As described above, temporal action localization system 300 can be trained by active learning, where a selection function g picks an unlabeled video sample v* from an unlabeled video set $U_t$ at each training step t. Most existing active learning techniques use heuristics to select the next samples to be annotated for training. Techniques disclosed herein replace these heuristics with a trainable selection function.

Figure 4:
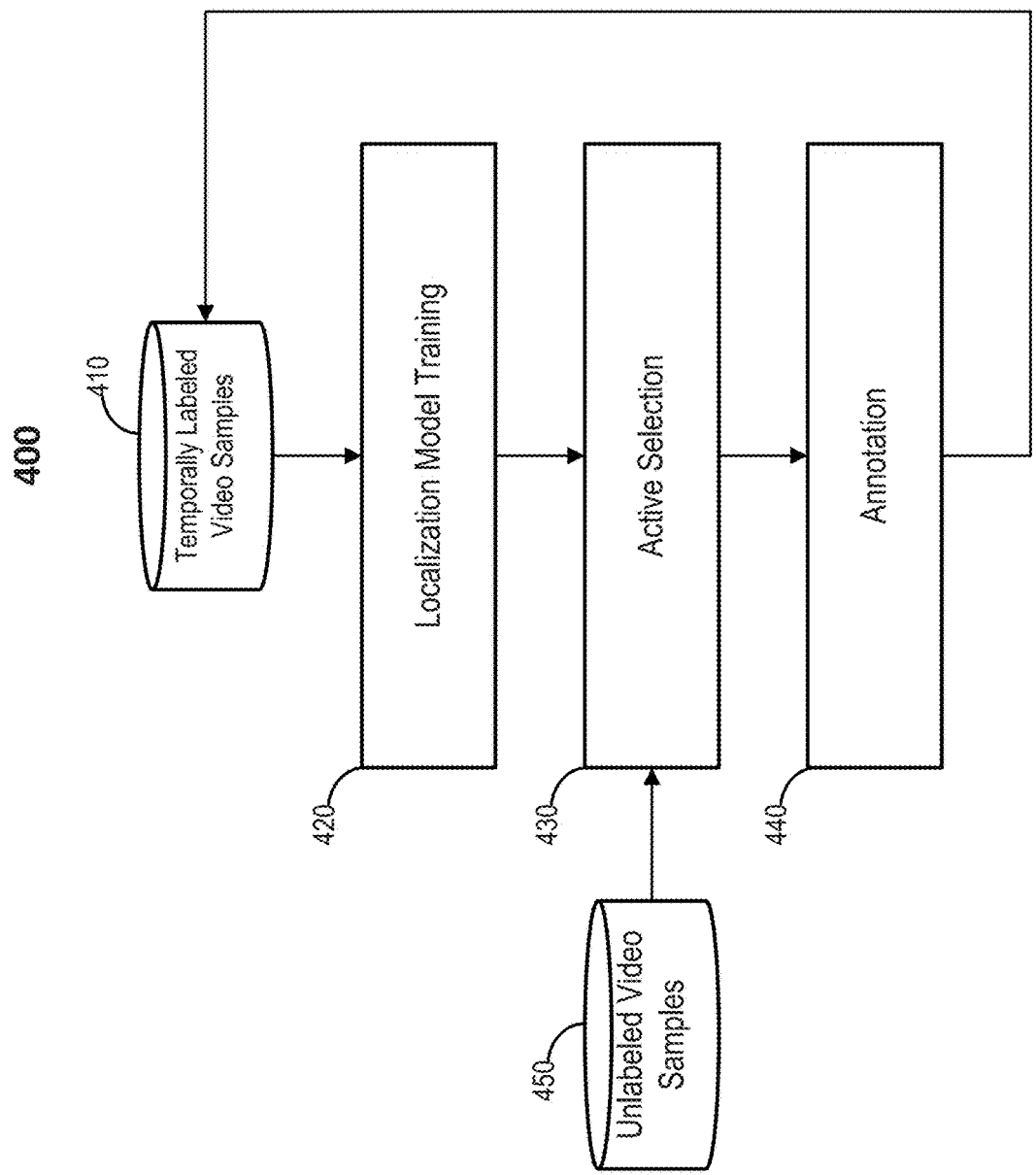
FIG. 4 is a simplified flow chart illustrating an example active learning-based method for training a temporal action localization system according to certain embodiments.

FIG. 4 is a simplified flow chart 400 illustrating an example active learning-based method for training a temporal action localization system according to certain embodiments. A set of temporally labeled video samples 410 is provided or otherwise obtained at the beginning of the training process. As described above, the set of temporally labeled video samples 410 can be obtained from, for example, ActivityNet. At block 420, a temporal action localization model is trained using the set of temporally labeled video samples 410 as described above with respect to FIG. 3. At block 430, a selection function uses the trained localization model to select one or more unlabeled video samples from a set of unlabeled video samples 450. In general, it is desirable that the selection function is generalized for unseen action categories. According to some embodiments, the selection function itself is a trainable function that can be trained based on the labeled video samples. In some implementations, instead of sampling directly based on the final detection results represented by $\{S^k, \{z_c\}_{c \in C}\}$ from action classifier 340, the selection function can be trained to select samples that can improve attention module 330 (e.g., represented by classifier $h_r$) the most, because the attention module 330 performs more complex tasks (e.g., temporal boundary generation) and its outputs directly affect the performance of action classifier 340 More details of the selection function and the training of the selection function are described below. At block 440, the one or more unlabeled video samples selected by the selection function from the set of unlabeled video samples 450 are annotated and added to the set of temporally labeled video samples to retrain the localization model. The operations in block 420, 430, and 440 can be performed recursively until an accurate and robust localization model is achieved or until all unlabeled video samples in the set of unlabeled video samples 450 have been selected and annotated.

Figure 5:
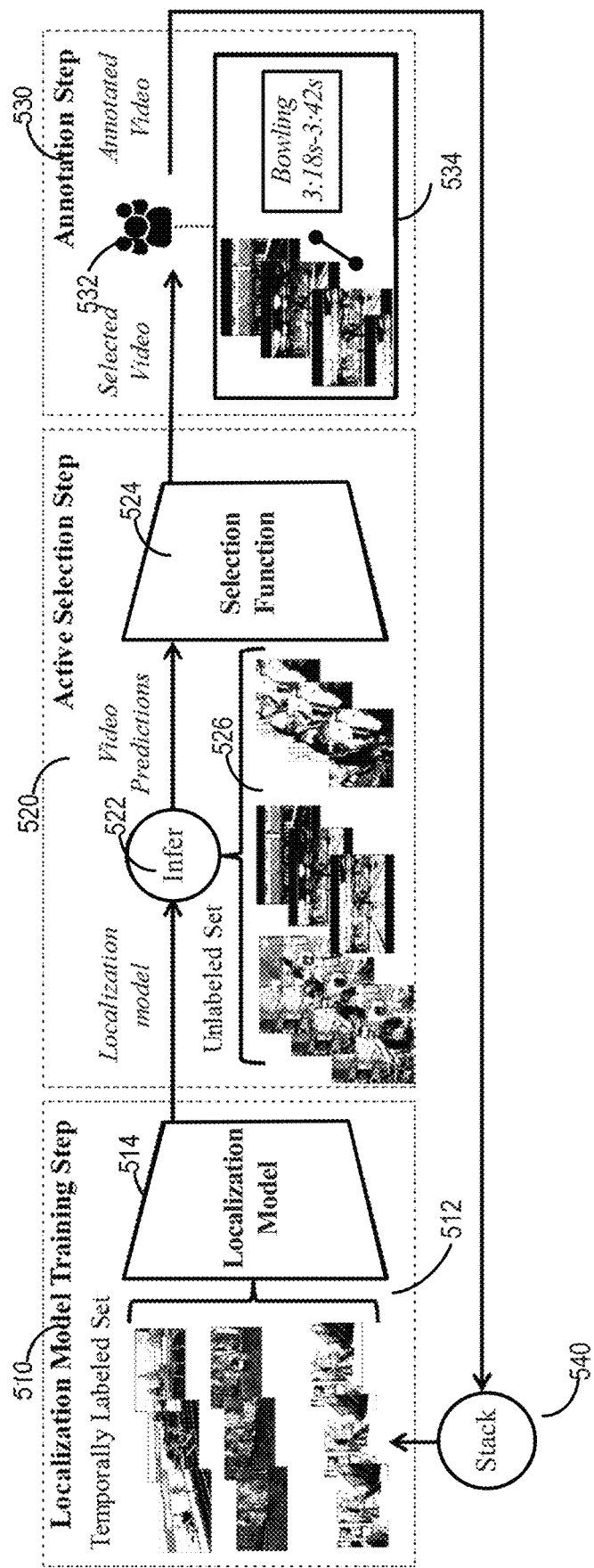
FIG. 5 illustrates an example active learning-based method for training a temporal action localization system according to certain embodiments.

FIG. 5 illustrates an example active learning-based method 500 for training a temporal action localization system according to certain embodiments. Active learning-based method 500 is one example implementation of the active learning-based method for training a temporal action localization system described with respect to FIG. 4. In the example shown in FIG. 5, active learning-based method 500 includes a localization model training step 510, an active selection step 520, and an annotation step 530. In localization model training step 510, a localization model 514 is trained using a set of temporally labeled video samples 512 as described above with respect to FIG. 3. Each temporally labeled video sample includes a set of temporal segments that may include actions of interest. The temporal segments can be determined using, for example, the DAPs technique as described above. In active selection step 520, the trained localization model 514 is used by an inference module 522 to predict the performance improvement of the localization model caused by each unlabeled video sample from a set of unlabeled video samples 526. Based on the predicted performance improvement, a selection function 524 is used to select an unlabeled video from the set of unlabeled video samples 526. More details of the inference module 522 and selection function 524 are described below. In annotation step 530, the selected unlabeled video sample is annotated by an oracle 532 (e.g., a person) to generate a labeled video sample 534. Labeled video sample 534 is then added to the set of temporally labeled video samples stored in a stack 540, and is used to retrain localization model 514.

Steps 510, 520, and 530 may be performed recursively until a desired localization model is generated or until all unlabeled video samples in the set of unlabeled video samples 526 have been selected and annotated. In general, the performance improvement of the localization model caused by each unlabeled video sample is predicted in each recursion, rather than using the performance improvement determined in previous recursions, to avoid selecting similar unlabeled video samples in different recursions. For example, if an unlabeled sample A is similar to unlabeled sample B, sample A and sample B may cause similar performance improvement to the localization model. When sample A is selected in one recursion to retrain the localization model, using sample B to retrain the localization model in the subsequent recursions may not improve the localization model much because a similar sample (e.g., sample A) has already been used to train the localization model. By re-predicting the performance improvement of the localization model caused by each unlabeled video sample, sample B may not be selected in the next recursion.

The active training method described above can also be used to train a neural network or other models for performing functions other than temporal action localization, such as speech recognition, information extraction, or other classification and filtering (e.g., audio event localization).

Figure 6:
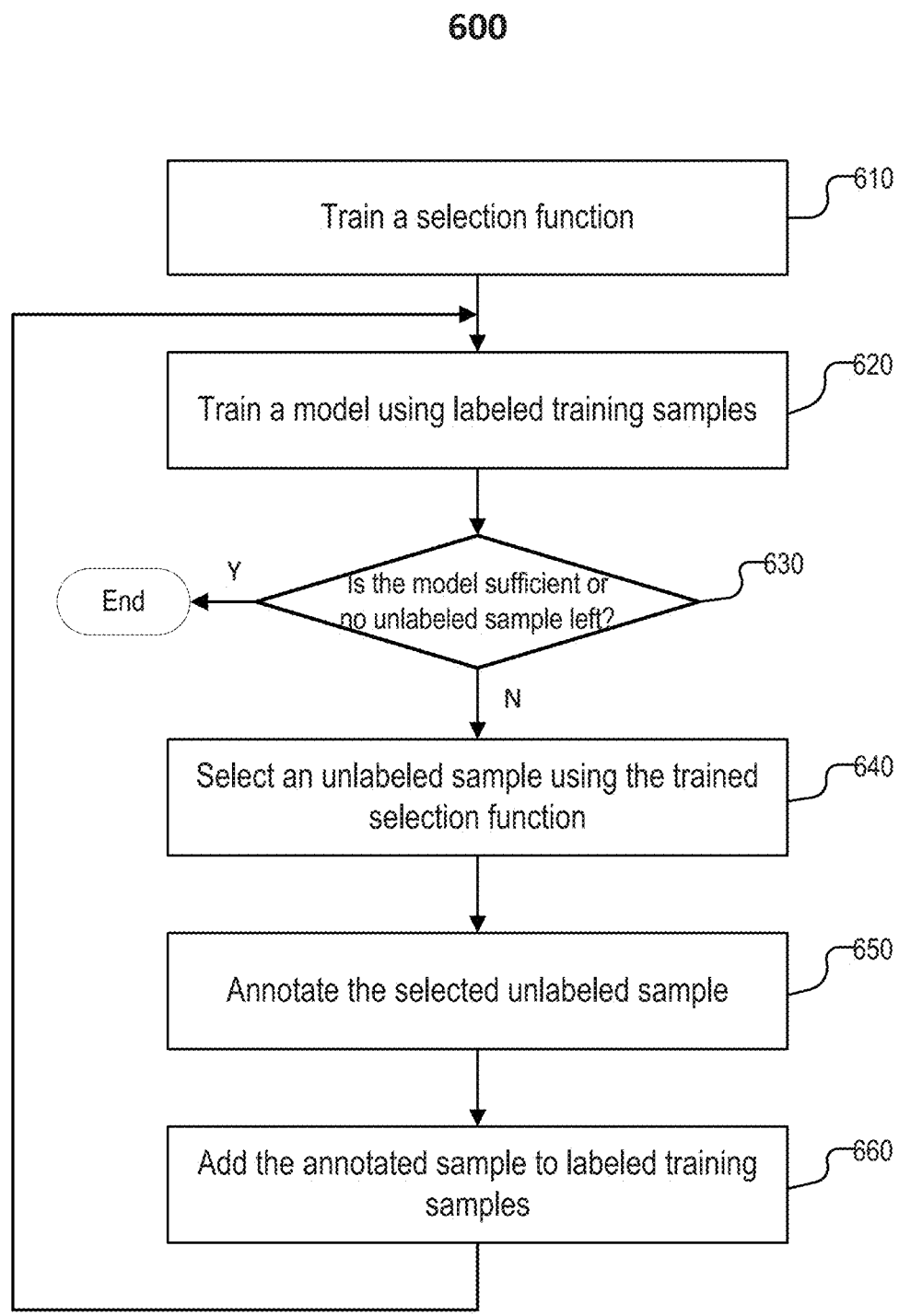
FIG. 6 is a simplified flow chart illustrating an example active learning-based method for training a machine-learning based model according to certain embodiments.

FIG. 6 is a simplified flow chart 600 illustrating an example active learning-based method for training a machine learning-based model according to certain embodiments. As described above, the machine learning-based model can be a temporal action localization model as described above with respect to FIGS. 3-5 or other models with trainable parameters, such as any artificial neural network.

At block 610, a selection function for actively selecting unlabeled samples is trained using available labeled training samples, such as temporally labeled video samples. An example method of training the selection function is described in detail below with respect to FIG. 7. At block 620, a machine-learning based model may be trained using the labeled training samples as described above. Example methods of training the model with labeled training samples are described above with respect to FIG. 3, block 420 of FIG. 4, and localization model training step 510 of FIG. 5. At block 630, it is determined whether the model trained at block 620 meets the desired performance requirements, such as the accuracy and robustness of the trained model, or if there is no unlabeled sample left to be selected. If the trained model meets the desired performance requirements or no unlabeled sample is left, the active learning-based training process may stop. Otherwise, the active learning-based training process may continue to block 640, where an unlabeled sample is selected from a set of unlabeled samples. As described above, in some embodiments, the selected unlabeled sample is the sample that is predicted to improve the model the most among all unlabeled samples in the set if each unlabeled sample is annotated and used (in combination with existing labeled samples) to retrain the current model. At block 650, the selected unlabeled sample is annotated. At block 660, the annotated sample is added to the training dataset and is fed to block 620, where the model is retrained using the training dataset including the new labeled sample. Operations at blocks 620-660 are performed recursively until the trained model meets the desired performance requirements or no unlabeled sample is left.

It is noted that even though FIG. 6 describes the training process as a sequential process, many of the operations can be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. For example, the operations at block 620 for training the model may be performed during the selection function training at block 610 as well, as described below with respect to FIG. 7. Some operations may be performed in parallel. The operations may be performed by a same entity or different entity as described above with respect to FIG. 2.

For example, operations at block 610 may be performed by one entity (e.g., a server computer), while operations at other blocks may be performed by another entity (e.g., a different server computer or an end user device). Furthermore, embodiments of the methods may be implemented in hardware, software, firmware, middleware, microcode, hardware description languages, or any combination thereof.

As discussed above, the selection function is trained to select samples that can improve the attention module (e.g., represented by classifier $h_t$) the most. In some implementations, the selection function can be trained using a regression learning technique. In some implementations, to train a selection function g, confidence scores are produced by applying a trained localization model (more specifically, attention module $h_t$) to temporal segments in each selection function learning sample (labeled but is used to simulate unlabeled sample to be selected and annotated) in a selection function learning sample set $U_t$: $X=[x_1, x_2, \ldots, x_{q_t}]$, where $X \in \mathbb{R}^{l \times p_t}$ is the confidence score matrix, l is the number of temporal segments in each sample, and $q_t$ is the number of samples in selection function learning sample set $U_t$. The improvement in performance of the attention module on a test set of samples (labeled but are used to simulate unlabeled test samples) caused by each sample in $U_t$ is determined. A feature matrix F is then constructed based on pairs of a model state and a sample description, where, in some implementations, a model state includes the SVM weights defining $h_t$ and the sample description corresponds to a histogram of confidence scores for each selection function learning sample in confidence score matrix X. In some implementations, the target vector η used for the regression learning is the improvement in localization performance (e.g., in mean Average Precision (mAP)) after the model $h_t$ for the attention module is retrained with each individual sample in $U_t$. The mAP can be determined by calculating the average accuracy of classifying a test sample in the test set of samples into different classes and then averaging the average accuracies for all test samples classified. A mapping between feature matrix F and target vector q (performance improvement) is determined using the regression learning technique, such as Support Vector Regression (SVR) technique. To generate a feature matrix F that includes enough pairs of model state and sample description, a Monte-Carlo procedure is used in one implementation as described in detail below. The selection function g uses the mapping to determine the improvement that can be made by each unlabeled sample and choose the unlabeled sample corresponding to the highest predicted performance improvement. Once trained, the selection function g can be applied to an unlabeled sample dataset to select the sample with the highest predicted performance improvement ($g(U_t) \rightarrow v$) for annotation and retraining the localization model.

As described above, in some implementations, feature matrix F that includes pairs of model state and sample description and target vector i to be regressed can be generated using a Monte-Carlo procedure to include sufficient number of pairs of model state and sample description. The Monte-Carlo procedure can be used to take a labeled train dataset $D_{train}$, a test dataset $D_{test}$ (labeled but is to simulate unlabeled samples for temporal action localization), and a set of partition sizes (numbers of labeled videos) $T=\{\tau_{min}, \ldots, \tau_{max}\}$, to produce feature matrix F and target vector η. Example pseudo code for implementing the Monte-Carlo procedure is shown in Table 1.

In the example shown in Table 1, the inputs for the Monte-Carlo procedure include train dataset $D_{train}$, test dataset $D_{test}$, attention module h, and a set of partition sizes $\{\tau_{min}, \ldots, \tau_{max}\}$. The outputs include Feature matrix F including pairs of model state and sample description, and target vector η for regression. Variables for the Monte-Carlo procedure include d and a (the dimensions of the model state and sample description, respectively), q (the number of initializations), $\tau_{size}$ (the number of different partition sizes), and m (the number of video samples to select from). In one specific example, $T=\{2^5, \ldots, 2^l\}$, where $l \in \{5, 6, \ldots, 13\}$, q=256, and m=512.

Machine (SVM) can be used to learn the classifier (e.g., a binary classifier) that discriminates between actions and background segments. Because, in each initialization i, the τ samples for sample set $L_{\tau i}$ are randomly selected, the localization model (including attention module $h_{\tau i}$) generated after the training in each initialization i may be different.

After the attention module $h_{\tau i}$ is trained, the model parameters $\Theta_{\tau i}$ for the attention module $h_{\tau i}$ are estimated. In some

TABLE 1

Pseudo code for generating feature matrix F and target vector η using Monte-Carlo procedure Input: training dataset $D_{train}$, test dataset $D_{test}$, attention module h, set of partition sizes , $\{\tau_{min}, \ldots, \tau_{max}\}$;
Output: Feature matrix F including pairs of model state and sample description, target vector η for regression;
Variables: d and a are the dimensions of the model state and sample description, respectively; q is the number of initializations; $\tau_{size}$ is the number of different partition sizes; and m is the number of video samples to select from
Initialize an empty 2-D array F including (d+a) rows and (q×$\tau_{size}$×m) columns;
Initialize an empty 1-D array η including (q×$\tau_{size}$×m) elements;
index ← index + 1
for τ in T = $\{\tau_{min}, \ldots, \tau_{max}\}$ do                      // select different sample partition
  for i in {1, 2, ..., q} do                                   // run initialization q times
    $L_{\tau i}, U_{\tau i}$ ← split_train_set($D_{train}$, τ)    // partition training samples into subsets
    $h_{\tau i}$ ← train_model($h_{\tau i}$, $L_{\tau i}$)       // train attention module h using first subset
    $\Theta_{\tau i}$ ← estimate_model_parameters($h_{\tau i}$) // determine parameters of model
    $\alpha_{\tau i}$ ← compute_test_set_parameters($h_{\tau i}$, $D_{test}$)  // determine base performance
    for j in {1, 2, ..., m} do                          // select one sample from second subset
      v ← select_sample_from_set($U_{\tau i}$)          // select a sample from second subset
      $L_{\tau ij}$ ← $L_{\tau i}$ ∪ v                   // combine selected sample with first subset
      $\psi_{\tau ij}$ ← describe_sampled_video($h_{\tau i}$, v)  // describe the selected sample (histogram)
      $h_{\tau ij}$ ← train_model($h_{\tau ij}$, $L_{\tau ij}$)    // retrain model using combined samples
      $\delta_{\tau ij}$ ← compute_test_set_parameters($L_{\tau ij}$, $D_{test}$) − $\alpha_{\tau i}$ // performance improvement
      F[index, :] ← [$\Theta_{\tau i}|\psi_{\tau ij}$]     // determine a state pair in feature matrix
      η[index] ← $\delta_{\tau ij}$                     // save performance improvement
      index ← index + 1                            // select next element for the feature matrix
Return: F, η

The example Monte-Carlo procedure shown in Table 1 starts with initializing Feature matrix F, target vector η, and the index for the pairs of model state and sample description and corresponding target vector elements (performance improvement). Each pair of model state and sample description and the corresponding target vector element are generated in each iteration where a sample is selected to add to the sample set for training the localization model.

The training dataset $D_{train}$ can be split into two disjoint sample sets L and U, which are the sample set for training the localization model and the sample set for training the selection function (labeled but is to simulate an unlabeled sample to be selected and annotated), respectively. The size of each sample set is determined by an input size τ (which is a variable) such that the number of samples in sample set L is equal to τ and the remaining samples from $D_{train}$ are assigned to U. In some implementations, τ is sequentially selected from $T=\{\tau_{min}, \ldots, \tau_{max}\}$. In some implementations, τ is randomly selected. For each splitting of the training dataset $D_{train}$ to select τ samples, multiple initializations can be performed. For example, in each initialization i, τ samples for sample set $L_{\tau i}$ can be randomly selected from training dataset $D_{train}$, and used to train the localization model. The remaining samples (m samples) in training dataset $D_{train}$ are used as sample set $U_{\tau i}$.

For each initialization, the localization model (including parameters for the attention module $h_{\tau i}$) as described in FIG. 3 is trained using sample set $L_{\tau i}$, where the parameters of the localization model are tuned to rank temporal segments in each sample in sample set L and classify the temporal segments. As described above, a linear Support Vector implementations, the model parameters $\Theta_{\tau i}$ include the SVM weights representing the state of attention module $h_{\tau i}$.

The mean Average Precision (mAP) achieved by attention module $h_{\tau i}$ on a test dataset $D_{test}$ is then determined, where true positives are assigned to proposed action segments that have a temporal Intersection over Union (tIoU) with ground-truth instances greater than, for example, 0.7. The mean Average Precision achieved by attention module $h_{\tau i}$ is used as the base performance value $\alpha_{\tau i}$ for determining the performance improvement when a new sample is added to sample set $L_{\tau i}$.

After the base performance of the localization model (more specifically, the attention module $h_{\tau i}$) is determined, samples in sample set $U_{\tau i}$ can be individually selected in each iteration j. For example, a sample v may be randomly or sequentially selected from sample set $U_{\tau i}$ in each iteration j, and the selected sample v is added to sample set $L_{\tau i}$ to form a new sample set $L_{\tau ij}$. The selected sample v is then described by a histogram of confidence scores produced by attention module $h_{\tau i}$ on temporal segments in selected sample v. In one example, a histogram with 32 bins represented by $\psi_{\tau ij}$ is used to describe the selected sample v in iteration j. The new sample set $L_{\tau ij}$ is used to retrain the attention module $h_{\tau i}$ to generate a model for attention module $h_{\tau ij}$. The mean Average Precision (mAP) achieved by attention module $h_{\tau ij}$ on test dataset $D_{test}$ is determined and compared with the base performance value $\alpha_{\tau i}$ to determine the performance improvement $\delta_{\tau ij}$ of attention module $h_{\tau ij}$ over attention module $h_{\tau i}$. Again, true positives can be assigned to proposed temporal segments that have a temporal Intersection over Union (tIoU) with ground-truth instances greater than, for example, 0.7. The model parameters $\Theta_{\tau i}$ for attention module $h_{\tau i}$ (corresponding to the model state) and $\psi_{\tau ij}$ describing the selected sample v (corresponding to the sample description) are added to feature matrix F as a pair of model state and sample description. The corresponding performance improvement $\delta_{\tau ij}$ is added to target vector $\eta$. These operations are performed for each sample v in sample set $U_{\tau i}$. Thus, if the number of samples in sample set $U_{\tau i}$ is m, m pairs of model state and sample description for feature matrix F and m elements for target vector $\eta$ can be generated for each initialization.

If the number of different partition sizes is $\tau_{size}$ and the number of initializations for each partition size is q, the total number of model state and sample description pairs and the total number of elements in target vector $\eta$ is $q \times \tau_{size} \times m$. As described above, a regression model can be generated based on feature matrix F and target vector $\eta$ to map the model state and sample description pair to the performance improvement. The regression model can then be used to predict the performance improvement that may be achieved if an unlabeled sample is annotated and added to the training dataset for retraining the localization model. The unlabeled sample associated with the highest performance improvement in a set of unlabeled samples can be selected for annotation.

FIG. 7 is a simplified flow chart 700 illustrating an example method for determining a selection function used in an active learning-based training process according to certain embodiments. Flow chart 700 provides an example implementation of the selection function training process described with respect to block 610 and Table 1. Flow chart 700 can be performed for one or more training sample partitions and one or more model initializations. As described above with respect to Table 1, the training sample dataset (labeled) can be split into two subsets, one subset for training the localization model and the other subset for training the selection function. The number of samples in each subset may be different for different partitions. The selection of the samples for each partition can be random in each model initialization. As such, even if the numbers of samples in the first subset are the same in two initializations, the samples in the first subset for one initialization are different from the samples in the first subset for another initialization.

For each sample partition and model initialization, operations at blocks 710-750 are performed. At block 710, a model (e.g., temporal action localization mode) is trained using the first subset of training samples to generate an initial model, as described above with respect to, for example, FIGS. 3-6 and Table 1. As also described with respect to Table 1, the model parameters for the localization model (or more specifically, the attention module) can be estimated to represent the model state for the initial model, and the performance (e.g., mAP) of the initial model on a set of test samples (also labeled for determining the performance of the trained model) can also be determined.

Each training sample in the second subset of training samples is selected and described individually, and the performance improvement of a new model retrained using the selected sample (after annotation) over the initial model is estimated at blocks 720-750. At block 720, the training sample selected from the second subset is described, for example, by a histogram of confidence scores produced by the initial module on temporal segments in the selected training sample. At block 730, the selected training sample is combined with the first subset of training samples to retrain the initial model. At block 740, the performance (e.g., mAP value) of the retrained model on the set of test samples is determined. At block 750, the performance improvement of the retrained model over the initial model is determined based on the performance of the initial model and the performance of the retrained model.

At block 760, a performance prediction model that maps an initial model and the description of a new training sample to be added to the first subset to the potential performance improvement of a new model retrained using the new training sample is determined. As described above with respect to Table 1, a feature matrix F can be generated based on the model state of the initial model and the description of the new training sample to be added to the first subset, and a target vector i can be generated based on the performance improvement of the retrained model over the initial model. The performance prediction model can be determined using, for example, a regression technique based on the feature matrix F and target vector $\eta$.

At block 770, a selection function that selects an unlabeled sample with the most improvement to an existing model from a set of unlabeled samples based on the performance prediction model and the existing model is determined. The selection model uses the performance prediction model to estimate the performance improvement associated with each unlabeled sample and selects the unlabeled sample with the highest performance improvement as the output of the selection function.

FIGS. 3-7 illustrate example flows for training and using a temporal action localization model to localize actions in untrimmed videos. A computer system, such as one including computer system 200 and end user device 250 of FIG. 2, can be configured to perform the illustrative flows in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

After a sample is selected from the unlabeled samples, it can be annotated by an oracle. The oracle's task is to annotate videos chosen by the active selection function. For example, the oracle can provide temporal bounds of all instances of actions of interest. In some implementations, crowdsourcing annotation is performed. In some implementations, Amazon Mechanical Turk (AMT) is used to annotate large-scale video datasets. In some implementations, the annotation is simulated using the ground-truth from existing and completely annotated datasets.

Techniques disclosed herein have been used in extensive experiments to demonstrate the capabilities of the disclosed active learner. The disclosed techniques are evaluated in a simulated environment (simulated annotators using samples with known ground-truth) to compare with other active learning techniques and are used to generate datasets for training temporal action localization models. The experimental results show that the disclosed techniques not only outperform other techniques by significant margins, but also enable the low-cost construction of large-scale datasets for temporal action localization or other video applications. The experimental results also show that the trainable selection function disclosed herein can be employed in batch mode to select more than one sample to be annotated in each step (making it suitable for real applications), is robust to noisy oracles, and can be fine-tuned when there are shifts in the data distributions. A dataset (referred to as Kinetics-Localization dataset) comprising 40,000 temporal annotations from 15,000 YouTube videos including 75 action classes is generated using the disclosed active learner by selecting samples from, for example, Kinetics videos, and annotating the selected samples by, for example, Amazon Mechanical Turk workers (Turkers).

The dataset used to conduct the experiments includes the ActivityNet dataset, the largest available dataset for temporal action localization. More specifically, the training and validation sets of ActivityNet 1.3, which include 14950 videos from 200 activity classes, are used. The mean Average Precision (mAP) metric is used to assess the performance of an action localization model. Following the standard evaluation of ActivityNet, mAP data at different temporal Intersection over Union (tIoU) thresholds (e.g., 0.5, 0.75, and 0.95) is reported. To summarize a method's performance, the mAP values in a range of tIoU thresholds (e.g., from 0.5 to 0.95 with an increment of 0.05) is averaged. To quantify the merit of the active learning techniques disclosed herein, the rate of increase of the mAP with increasing training set sizes (e.g., increasing percentage of the dataset used to train the localization model) is observed.

To analyze the performance of the disclosed active learner on unseen categories, two category-disjoint subsets of video samples are extracted from ActivityNet. The first subset (referred to as ActivityNet-Learning subset) includes 11160 videos from 150 action categories. The ActivityNet-Learning subset is primarily used to train the learnable selection function as described above with respect to Table 1 and FIG. 7. The second subset (referred to as ActivityNet-Selection subset) includes 2790 videos from 50 action categories, which do not overlap with the ones in the ActivityNet-Learning subset. The ActivityNet-Selection subset is mainly used to conduct the active learning experiments. Additionally, to measure the performance of the localization model, a Testing set, which includes 1000 unseen videos from the same 50 categories as in the ActivityNet-Selection subset, is used. There is no overlap between the Testing set and the ActivityNet-Selection subset.

The following protocol is used to perform the diagnostic experiments. The selection function is trained using the labeled sample data in the ActivityNet-Learning subset by following the method described above with respect to Table 1 and FIG. 7. Once the selection function is trained, about 10% of the samples from the ActivityNet-Selection subset is randomly selected as a training set to learn an initial action localization model. The mAP performance of the model on the Testing set is evaluated, and the active learner is applied to the remaining (about 90%) video samples of the ActivityNet-Selection subset to select one or more samples to be annotated next. Subsequently, the oracle is used to obtain temporal annotations for the selected video sample(s). In the experiments, the oracles are simulated by using the ground-truth from existing datasets that have already been annotated. Finally, the training set is augmented with the newly annotated sample(s) and is used to retrain the action localization model. This sample selection, annotation, and retraining process is repeated until all samples in the ActivityNet-Selection subset are used for training the action localization model.

The techniques disclosed herein are compared with the uncertainty selection technique and the random selection technique for active learning. As described above, the uncertainty selection technique samples videos with the most uncertain predictions. The entropy of the video predictions (e.g., the histogram of confidence scores in the columns of X described above) is calculated and the video sample with the highest entropy value is selected. The random selection technique randomly selects one of the videos from the unlabeled set.

Figure 8:
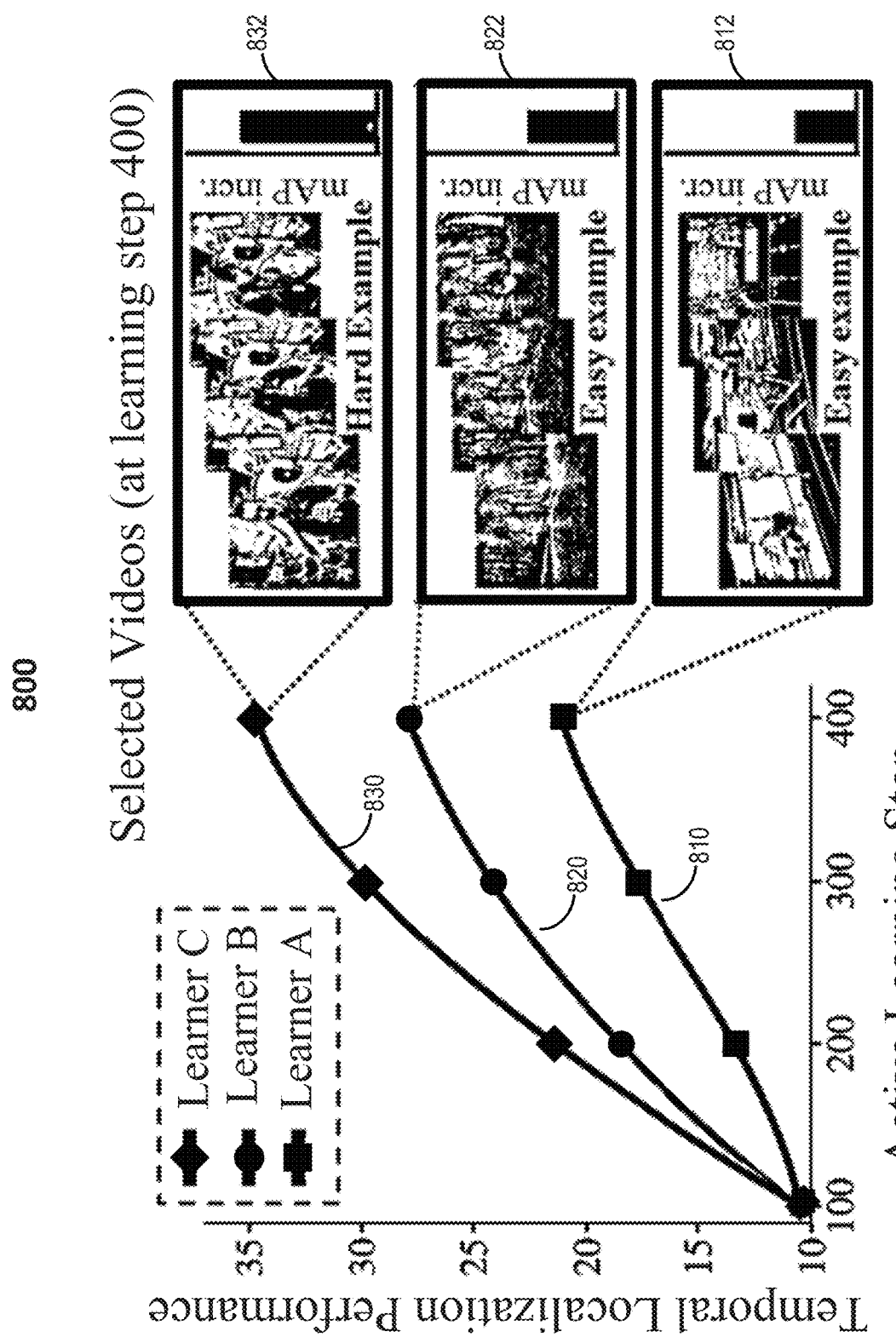
FIG. 8 illustrates the performance differences between other active learning techniques and the active learning technique according to certain embodiments.

FIG. 8 illustrates the performance differences between other active learning techniques and the active learning technique according to certain embodiments. FIG. 8 depicts the learning process of three different active learning techniques for action localization in untrimmed videos. Learner A represents a learner that randomly selects samples to be annotated for future training iterations. Learner A exhibits passive behavior in making selections of samples to augment its training set. Learner B is an active learner that uses uncertainty sampling to select the samples whose labels are most uncertain. Learner C is an active learner according to certain embodiments disclosed herein. To evaluate each learner, the action localization performance on a labeled video set is measured at different training dataset sizes (or learning stages). The progress of the learning process using learner A is shown by a curve 810, the progress of the learning process using learner B is shown by a curve 820, and the progress of the learning process using learner C is shown by a curve 830. As illustrated, because learner B incorporates knowledge about the current localization model in performing the selection, learner B shows a better performance than Learner A. Learner C uses a learnable selection function that infers the expected performance improvement of adding a candidate unlabeled sample to the training set and selects the one that would provide the highest improvement. Thus, learner C performs much better than learner B. In addition, learner C exhibits multiple selection behaviors, which depend on the state of the current localization model. For instance, learner C can potentially select "simple" or "easy" examples (e.g., include one or very few actions) when the training is at early learning stages, and could select harder ones (e.g., include multiple actions) at later stages when the model has been trained with a large enough number of samples. In the examples in FIG. 8, at learning step 400, learner A selects an easy sample 812 that would provide a small amount of performance improvement, learner B selects an easy sample 822 that would provide a larger amount of performance improvement, and learner C selects a hard sample 832 that would provide a largest amount of performance improvement.

Figures 9A, 9B, 9C:
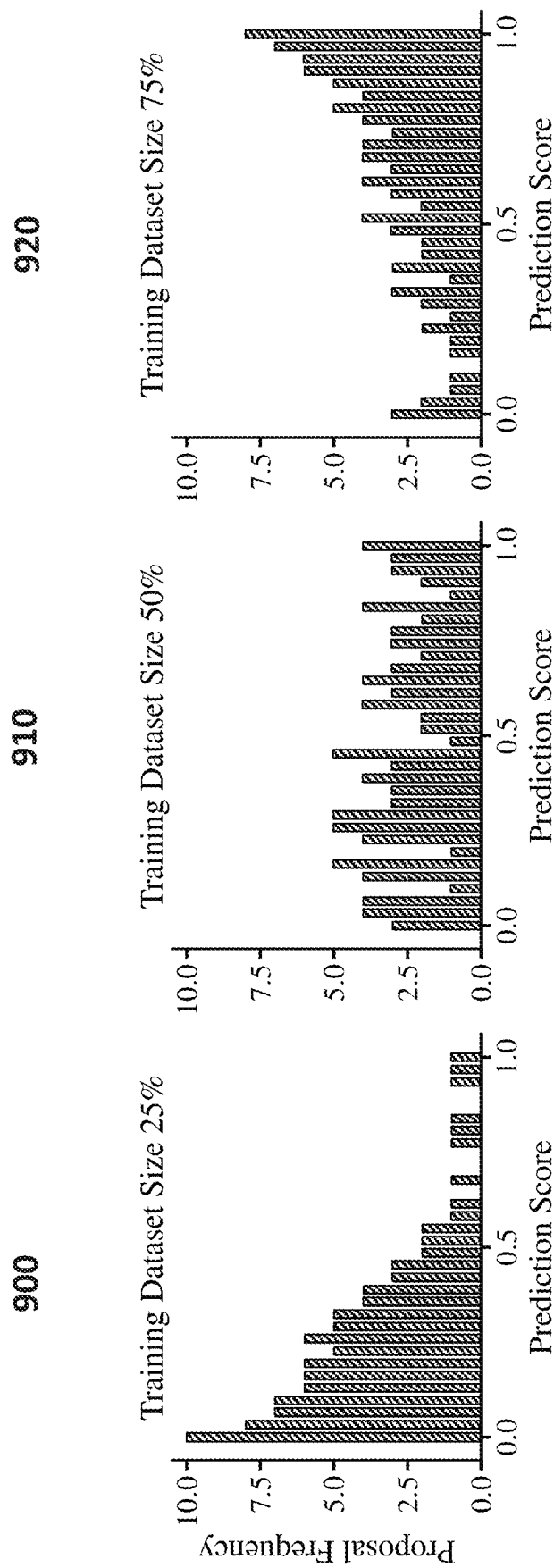
FIGS. 9A-9C show example histograms of confidence scores of video samples selected at different stages of an example training process according to certain embodiments.

FIGS. 9A-9C illustrate example histograms of the confidence scores of video samples selected at different stages of an example training process according to certain embodiments. FIG. 9A is an example histogram of the confidence scores of a video selected at an early stage of an example training process. FIG. 9B is an example histogram of the confidence scores of a video selected during the middle of an example training process. FIG. 9C is an example histogram of the confidence scores of a video selected at a late stage of an example training process. FIGS. 9A-9C show that the trainable active selection function exhibits different selection behaviors depending on the state of the localization model. For example, at early learning stages (e.g., about 25% of training data used), the trainable active selection function tends to select video samples that have peak values at low prediction scores in their histograms of the confidence scores, as shown in FIG. 9A. Samples with such histograms are typical simple samples because the majority of training videos includes a single action instance or very few action instances. When about 50% of the training data has been used, the trainable active selection function behaves like the uncertainty selection function, where the confidence scores of the selected video sample are relatively evenly distributed as shown in FIG. 9B. At later stages (e.g., after about 75% of the training data has been used), the trainable active selection function selects atypical video samples, such as video samples in which more temporal segments have high confidence scores.

Figure 10A:
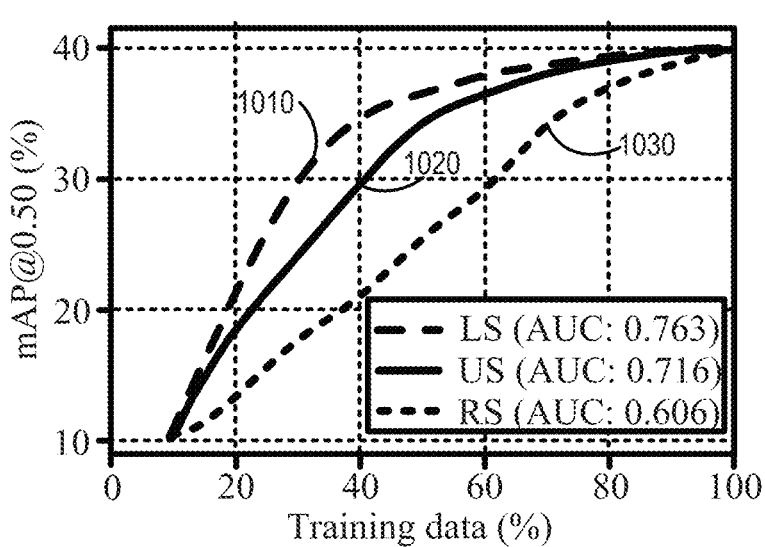
FIGS. 10A-10C illustrate the performance differences between other active learning techniques and the active learning technique according to certain embodiments.
Figure 10B:
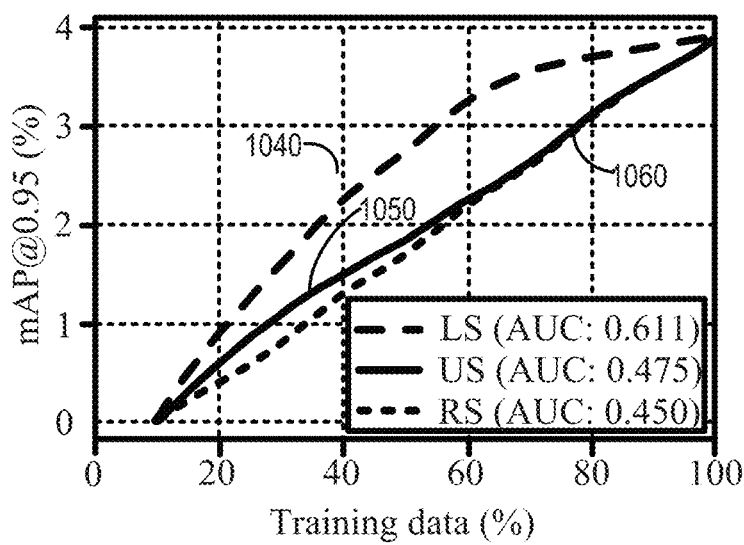
Figure 10C:
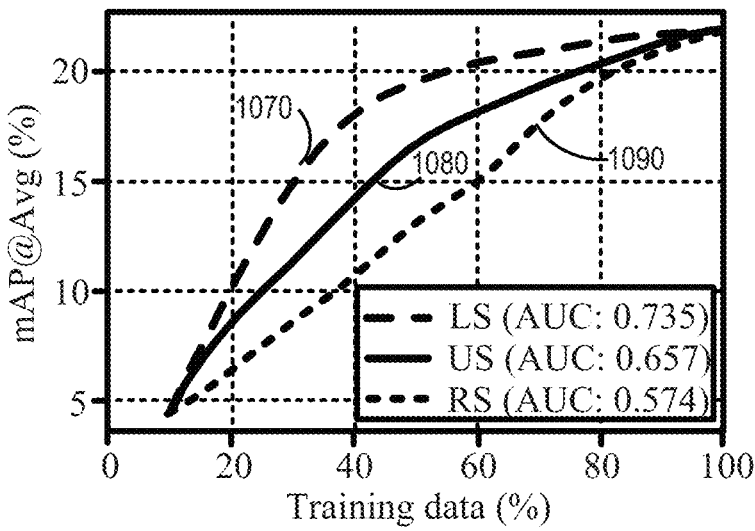

FIGS. 10A-10C illustrate the simulated performance differences between other active learning techniques and the active learning technique according to certain embodiments. FIGS. 10A-10C show the comparison of the mAP performance on the Testing set for the uncertainty selection technique, the random selection technique, and the trainable active selection technique disclosed herein. At each tIoU threshold for determining the true positives, the mAP of the localization model increases with the increase in training data, where new samples selected according to the three active learning techniques are iteratively added to the training data. The results indicate the effectiveness of each technique in terms of how much improvement is made by adding a certain amount of training data.

FIG. 10A is a chart 1000 showing the performance of the uncertainty selection technique, the random selection technique, and the trainable active selection technique disclosed herein at different stages of the training process when the tIoU threshold for determining the true positives is 0.5. The x-axis of chart 1000 indicates the percentage of the samples in the ActivityNet-Selection subset used to train the action localization model. The y-axis indicates the performance measured using mAP (in percent). The progress of the learning process using the random selection technique is shown by a curve 1030, the progress of the learning process using the uncertainty selection technique is shown by a curve 1020, and the progress of the learning process using the trainable active selection technique is shown by a curve 1010.

FIG. 10B is a chart 1005 showing the performance of the uncertainty selection technique, the random selection technique, and the trainable active selection technique disclosed herein at different stages of the training process when the tIoU threshold for determining the true positives is 0.95. The progress of the learning process using the random selection technique is shown by a curve 1060, the progress of the learning process using the uncertainty selection technique is shown by a curve 1050, and the progress of the learning process using the trainable active selection technique is shown by a curve 1050.

FIG. 10C is a chart 1015 showing the performance of the uncertainty selection technique, the random selection technique, and the trainable active selection technique disclosed herein at different stages of the training process when the tIoU threshold for determining the true positives is the average tIoU threshold in a range of tIoU thresholds (e.g., from 0.5 to 0.95 with an increment of 0.05). The progress of the learning process using the random selection technique is shown by a curve 1090, the progress of the learning process using the uncertainty selection technique is shown by a curve 1080, and the progress of the learning process using the trainable active selection technique is shown by a curve 1070.

FIGS. 10A-10C indicate that the trainable active selection technique significantly outperforms the uncertainty selection technique and the random selection technique. For example, to achieve 15% mAP for averaged tIoU (shown in FIG. 10C), the trainable active selection technique uses only 30% of the samples in the training data (the ActivityNet-Selection subset), while the uncertainty selection technique and the random selection technique use 42% and 60% of the training data respectively to achieve the same mAP performance. At higher tIoU thresholds, the difference in mAP between the trainable active selection technique and the uncertainty selection technique is even more substantial. In FIG. 10B (tIoU threshold at 0.95), the trainable active selection technique obtains 2.3% mAP using only 40% of the training data, while the uncertainty selection technique (and similarly the random selection technique) uses 60% of the training data to reach the same performance. This performance improvement may be due to the fact that the trainable active selection technique directly uses the current state of the localization model to make its selection at every training step, and thus it inherently has better knowledge about the dataset to be annotated as compared to the simple heuristics used by the uncertainty selection technique.

Retraining a model whenever a single new sample is available could be prohibitively expensive. Batch-mode active learning has been proposed to reduce the cost of the training. In batch-mode, an active learner selects a group of samples instead of a single sample in each iteration. According to certain embodiments, the trainable active selection function ranks all the unlabeled samples based on the predicted performance improvement each unlabeled sample is expected to cause when it is added to the training sample set, and selects the top ranked ones. Table 2 summarizes the average mAP performance (across tIoU thresholds) for different selection batch sizes. The performance when a single sample is selected in each iteration (i.e., a batch size of 1) is included as a reference.

The benefits associated with fine-tuning of the trainable active selection function are studied and shown in Table 2 as well. Instead of fixing the selection function to what is learned using the ActivityNet-Learning subset, the selection function is fine-tuned using the newly annotated data from the ActivityNet-Selection subset. The performance of the trainable active selection function with and without fine-tuning is shown in Table 2.

TABLE 2

Results of the batch-mode and fine-tuning analyses

| Selection | Avg. Mean AP (mAP) at different dataset sizes | | | | |
|---|---|---|---|---|---|
| Batch Size | 10% | 25% | 50% | 75% | 100% |
| w/o fine-tune | | | | | |
| 256 | 4.5 | 10.2 | 17.8 | 20.3 | 21.8 |
| 128 | 4.5 | 11.6 | 18.9 | 21.0 | 21.8 |
| 64 | 4.5 | 11.9 | 19.0 | 20.9 | 21.8 |
| 32 | 4.5 | 12.1 | 19.3 | 21.0 | 21.8 |
| Single selection | 4.5 | 12.7 | 19.5 | 21.1 | 21.8 |
| Fine-tuned | | | | | |
| 256 | 4.5 | 11.9 | 18.8 | 20.9 | 21.8 |
| 128 | 4.5 | 12.4 | 19.1 | 21.1 | 21.8 |
| 64 | 4.5 | 12.6 | 19.2 | 21.1 | 21.8 |
| 32 | 4.5 | 12.7 | 19.4 | 21.2 | 21.8 |
| Single Selection | 4.5 | 13.1 | 19.7 | 21.4 | 21.8 |

The results shown in Table 2 indicate that the trainable active selection function is robust to large selection batch sizes. For example, with 25% of the ActivityNet-Selection subset used (w/o fine-tuning), the mAP achieved using the trainable active selection function only decreases by about 1.1% when a batch size 128 instead of a single selection is used, which reduces the number of models to be trained for 128 new samples from 128 to 1. Increasing the batch size from 128 to 256 results in a slight mAP drop (e.g., about 1.4%). The robustness of the trainable active selection function may be attributed to the fact that it estimates the performance improvement for each sample independently. Due to the trade-off between the computational footprint and the corresponding performance, the selection batch size is set to 128 for remaining experiments.

The results in Table 2 also show that the fine-tuning further improves the performance of the trainable active selection function. For example, using a batch size of 128 and using 25% of the training data, the fine-tuning strategy enhances the performance by about 0.8%. Such improvements demonstrate the capability of the trainable active selection function to adapt itself to new data distributions. Moreover, the computational requirements to fine-tune the trainable active selection function are negligible compared with the computational requirements for fine tuning the localization model, thus making the trainable active selection function suitable for online active learning.

The performance of the trainable active selection function when exposed to noisy oracles is evaluated as well. To evaluate the robustness of the trainable active selection function against noisy annotations, the performance of the trainable active selection function when different levels of noise are injected into the oracle responses is measured. The noise is quantified in terms of how much an oracle response differs (in tIoU) from the original ground-truth. For example, at 5% noise level, the oracle labels action instances such that they have a 95% tIoU with the original annotated action instances. Similar to previous analysis, Table 3 reports the average mAP at different training dataset sizes, different noise levels, and with and without fine-tuning. The results show that the trainable active selection function can handle high levels of annotation noise well, and its performance even improves when noises at low levels (e.g., about 5%) are added. This improvement may be due to the fact that such low levels of noises can be seen as adversarial examples, which have been demonstrated to be beneficial for training.

TABLE 3

Results of noisy oracle analyses

| Induced Noise | Avg. Mean AP at dataset size | | | | |
|---|---|---|---|---|---|
| | 10% | 25% | 50% | 75% | 100% |
| w/o fine-tune | | | | | |
| 75% | 4.5 | 5.8 | 6.6 | 7.1 | 7.4 |
| 50% | 4.5 | 9.7 | 15.6 | 18.0 | 18.9 |
| 25% | 4.5 | 10.8 | 17.1 | 20.6 | 21.3 |
| 5% | 4.5 | 12.1 | 19.2 | 21.3 | 22.1 |
| w/o noise | 4.5 | 11.6 | 18.9 | 21.0 | 21.8 |
| Fine-tuned | | | | | |
| 75% | 4.5 | 6.3 | 7.1 | 7.8 | 8.2 |
| 50% | 4.5 | 10.7 | 16.2 | 19.0 | 19.8 |
| 25% | 4.5 | 12.3 | 19.1 | 21.0 | 21.7 |
| 5% | 4.5 | 12.9 | 19.5 | 21.5 | 22.4 |
| w/o noise | 4.5 | 12.4 | 19.1 | 21.1 | 21.8 |

Live experiments are performed as well using the trainable active selection function, where the trainable active selection function is used to generate a dataset for temporal action localization or other video applications. Instead of collecting the dataset from scratch, available videos from the Kinetics dataset (a video-level action classification dataset) are used as the starting dataset and are enriched with temporally localized annotations for actions in the videos. Whether the original Kinetics dataset is suitable for temporal localization is studied first. The trainable active selection function is then used to generate temporal annotations for the Kinetics videos, and the performance of the models trained with the generated temporal action localization dataset is evaluated.

The Kinetics dataset is one of the largest available datasets for action recognition. To construct the temporal action localization dataset, Amazon Mechanical Turk (AMT) is used to decide whether a 10-second clip contains a target action. To gather the pool of clips to be annotated or confirmed by AMT, a large set of videos is obtained by searching the descriptions of the actions in the titles of YouTube videos. Then, a classifier that is trained using images returned by Google Image Search (e.g., using the descriptions of the actions) is used to determine where the 10-second clip to be annotated is extracted from. As a result, more than 300,000 videos for 400 different action labels are obtained, where each video includes only one annotated action clip. This large dataset has enabled the development of novel neural network architectures for video applications.

The Kinetics dataset is not designed for the task of temporal action localization. Action detectors that are trained using the original Kinetics dataset exhibit a poor action localization performance at higher tIoU thresholds. In some embodiments, the 10-second clips are used to train the action localization models, and all remaining content in the video from which a clip comes from is assumed to only include background information. At test time, a sliding-window approach and filter duplicate detections are used by applying non-maximum suppression. To properly quantify the performance, a portion of a Kinetics validation subset is fully annotated with temporal annotations, which is referred to as Kinetics-Localization Testing Set. More specifically, 3750 videos from 75 classes of the 400 classes, which are the most suitable for temporal localization, are annotated.

To compile the Kinetics-Localization dataset, a video annotation system is developed to localize actions in time. A semi-automatic method is used in the video annotation system to take a video and a target action as inputs and produce time intervals during which the target action appears in the video. In some implementations, the video annotation system includes a localization module that provides a pool of temporal segments that are likely to include actions of interest, and a verification module that determines whether the temporal segments truly include the actions of interest. Given a video and a target action, the localization module is used to generate a set of temporal annotations where the target action may occur. At least one of the resultant temporal segments is assumed to include the target action. Amazon Mechanical Turk workers (Turkers) are employed to review and to provide the video annotations. An online user interface is provided to allow the Turkers to quickly scan the video and define starting and ending times of multiple actions. Once a set of candidate temporal segments for a video is available, the verification module inspects and selects temporal segments that correctly match the target action. This task may also be performed by Turkers.

Two different temporal action localization models are evaluated using the Kinetics-Localization dataset. One temporal action localization model is the staged temporal action localization model described above with respect to FIG. 3. The other model is an End-to-End Structured Segmented Network (SSN) introduced by Zhao et al. ("Temporal action detection with structured segment networks," ICCV, 2017), which is chosen because a state-of-the-art performance is reported for it. Table 4 shows the temporal localization performance of both models at different tIoU thresholds on the Kinetics-Localization Testing Set described above. Table 4 shows that the performance for both models at lower tIoU thresholds (e.g. 0.05) is close to the achieved performance of previous work for trimmed video classification. However, when the tIoU threshold is increased to 0.25, the performance of both models drops drastically. For example, the mAP of the End-to-End SSN model decreases from 67.7% to 32.8%. Moreover, when typical tIoU thresholds for localization (e.g., 0.5 to 0.95) are used, both models perform poorly. This may be due to the fact that the Kinetics dataset used for training does not include accurate temporal action bounds for the selected 75 classes in the Kinetics-Localization Testing Set, thus preventing the localization models from reasoning about the temporal configurations of the actions in the 75 classes.

TABLE 4

Temporal action localization performance of staged model and End-to-End SSN using Kinetics dataset

| tIoU threshold | Avg. Mean AP at dataset size 10% | | | | | Trim Data |
|---|---|---|---|---|---|---|
| | 10% | 25% | 50% | 75% | 100% | |
| Staged | | | | | | |
| 0.05 | 30.4 | 53.7 | 63.3 | 70.5 | 72.1 | 58.9 |
| 0.25 | 25.8 | 39.7 | 46.2 | 51.8 | 54.5 | 29.8 |
| 0.5 | 16.2 | 27.3 | 35.1 | 42.8 | 45.1 | 13.7 |
| 0.75 | 15.4 | 19.7 | 23.2 | 24.0 | 24.5 | 8.1 |
| 0.95 | 0.9 | 2.2 | 2.7 | 3.0 | 3.1 | 1.1 |
| End-to-End | | | | | | |
| 0.05 | 34.5 | 57.6 | 68.8 | 70.2 | 72.8 | 67.7 |
| 0.25 | 26.1 | 38.7 | 44.9 | 51.6 | 55.0 | 32.8 |
| 0.5 | 15.9 | 25.9 | 32.8 | 44.7 | 49.6 | 15.0 |
| 0.75 | 13.1 | 16.8 | 23.0 | 24.8 | 26.1 | 8.9 |
| 0.95 | 0.4 | 1.8 | 2.9 | 3.7 | 4.4 | 1.2 |

Table 4 also shows that both models benefit significantly from the collected data. When comparing the performance of the staged temporal action localization model at 25% dataset size to the performance of the same model retrained using the trimmed Kinetics data (a single trimmed 10-second clip per video), an improvement of about 21.4% in mAP is achieved on the test set. This validates the need for temporal annotations to train localization models. Moreover, significant increases in performance are achieved when the data size increases from 10% to 25% of the dataset, which indicates that the trainable active selection function is intelligently selecting the right samples to annotate.

The Kinetics-Localization dataset comprising 40,000 temporal annotations from 15,000 YouTube videos for 75 action classes is likely to stimulate the development of novel temporal localization techniques as other datasets (e.g., Thumos 14, ActivityNet, and Charades) have done in recent years. Moreover, the trainable active learning function may be a useful tool for building more accurate localization models with lower annotation cost.

Figure 11:
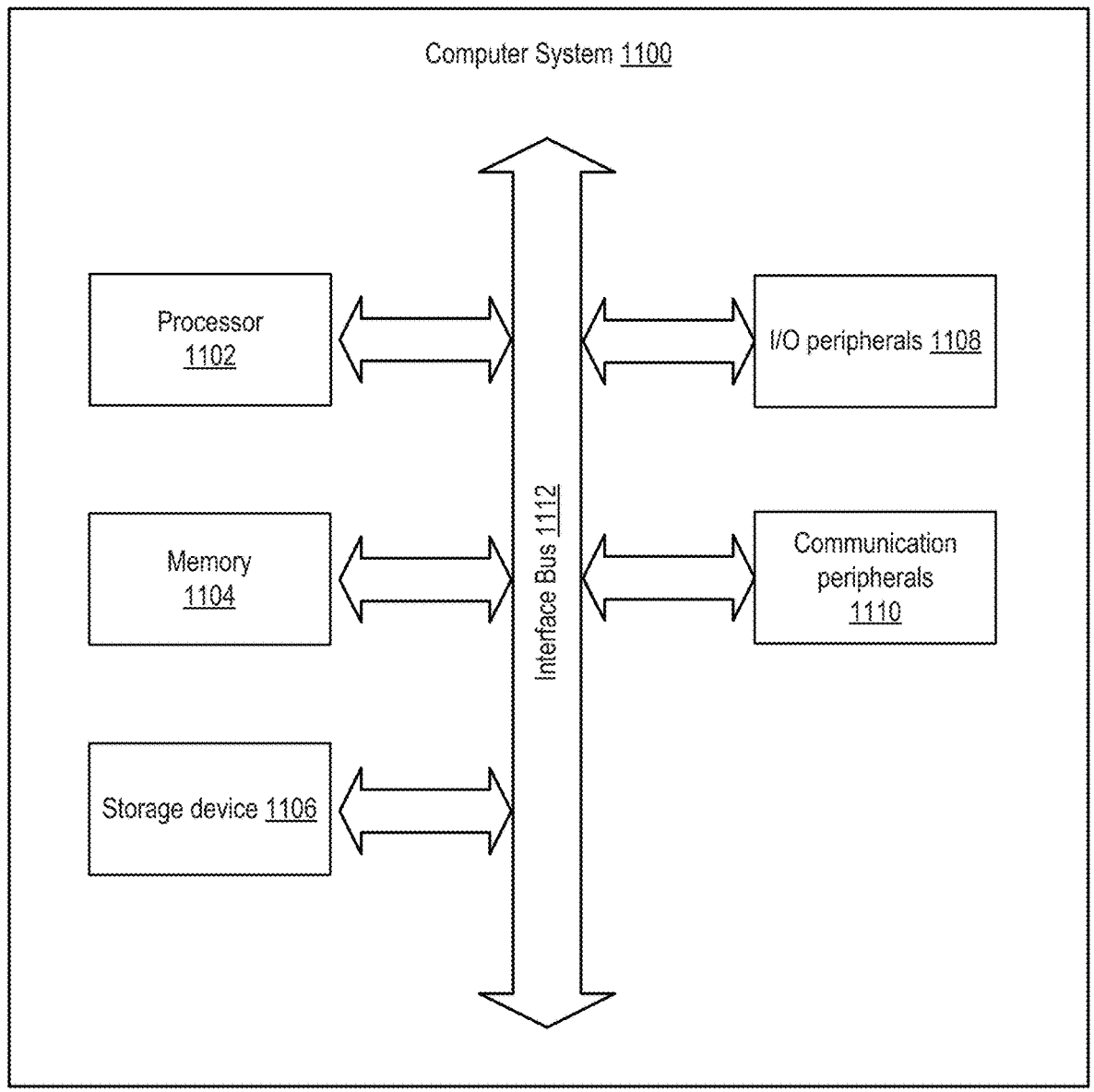
FIG. 11 illustrates an example computer system for implementing some of the embodiments disclosed herein.

FIG. 11 illustrates an example computer system 1100 for implementing some of the embodiments disclosed herein. Computer system 1100 may have a distributed architecture, where some of the components (e.g., memory and processor) are part of an end user device and some other similar components (e.g., memory and processor) are part of a computer server. Computer system 1100 includes at least a processor 1102, a memory 1104, a storage device 1106, input/output (I/O) peripherals 1108, communication peripherals 1110, and an interface bus 1112. Interface bus 1112 is configured to communicate, transmit, and transfer data, controls, and commands among the various components of computer system 1100. Memory 1104 and storage device 1106 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. Memory 1104 and storage device 1106 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with computer system 1100.

Further, memory 1104 includes an operating system, programs, and applications. Processor 1102 is configured to execute the stored instructions and includes, for example, a logical processing unit, a microprocessor, a digital signal processor, and other processors. Memory 1104 and/or processor 1102 can be virtualized and can be hosted within another computing systems of, for example, a cloud network or a data center. I/O peripherals 1108 include user interfaces, such as a keyboard, screen (e.g., a touch screen), microphone, speaker, other input/output devices, and computing components, such as graphical processing units, serial ports, parallel ports, universal serial buses, and other input/output peripherals. I/O peripherals 1108 are connected to processor 1102 through any of the ports coupled to interface bus 1112. Communication peripherals 1110 are configured to facilitate communication between computer system 1100 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for training a localization model that comprises a neural network and identifies a temporal location of an action in a video stream, the method comprising:

training, by a computer system, the localization model based on a set of labeled video samples;

for each unlabeled video sample in a set of unlabeled video samples, determining, by the computer system based on a trainable selection function, a predicted performance improvement of the localization model associated with retraining the localization model using the unlabeled video sample in combination with the set of labeled video samples;

selecting, by the computer system based on the predicted performance improvement of the localization model for each unlabeled video sample in the set of unlabeled video samples, a first unlabeled video sample from the set of unlabeled video samples;

receiving by the computer system, a first annotation to the first unlabeled video sample, wherein the first annotation and the first unlabeled video sample form a first labeled video sample; and retraining, by the computer system, the localization model based on the set of labeled video samples and the first labeled video sample, wherein an updated localization model is generated upon completion of the retraining.

2. The computer-implemented method of claim 1, wherein retraining the localization model comprises:

extracting feature vectors for a plurality of temporal segments in the first labeled video sample;

selecting, based on the extracted feature vectors, a temporal segment that is estimated to be associated with an action; and classifying the action associated with the selected temporal segment.

3. The computer-implemented method of claim 1, further comprising:

for each remaining unlabeled video sample in the set of unlabeled video samples, determining, based on the trainable selection function, a predicted performance improvement of the updated localization model associated with retraining the updated localization model;

selecting, based on the predicted performance improvement of the updated localization model, a second unlabeled video sample from remaining unlabeled video samples in the set of unlabeled video samples;

receiving a second annotation to the second unlabeled video sample, wherein the second annotation and the second unlabeled video sample form a second labeled video sample; and retraining, by the computer system, the updated localization model based on the set of labeled video samples, the first labeled video sample, and the second labeled video sample.

4. The computer-implemented method of claim 1, further comprising:

training the trainable selection function based on a second set of labeled video samples.

5. The computer-implemented method of claim 4, further comprising:

retraining the trainable selection function based on the first labeled video sample.

6. The computer-implemented method of claim 4, wherein:

training the trainable selection function comprises determining a performance prediction model that maps a video sample and a current localization model to a predicted performance improvement for the current localization model associated with retraining the current localization model based on the video sample; and determining the predicted performance improvement of the localization model comprises determining the predicted performance improvement based on the performance prediction model.

7. The computer-implemented method of claim 6, where determining the performance prediction model comprises:

splitting the second set of labeled video samples into a first subset of video samples and a second subset of video samples;

training the current localization model based on the first subset of video samples;

determining a performance of the current localization model on a set of test video samples;

for each video sample in the second subset of video samples, retraining the current localization model based on the first subset of video samples and the video sample in the second subset, wherein a new localization model is generated upon completion of the retraining;

determining a performance of the new localization model on the set of test video samples; and determining a performance improvement based on the performance of the new localization model and the performance of the current localization model; and determining the performance prediction model based on parameters of the current localization model, parameters of each video sample in the second subset of video samples, and the performance improvement for each video sample in the second subset of video samples.

8. The computer-implemented method of claim 7, wherein determining the performance prediction model comprises:

performing a regression learning process using the performance improvement for each video sample in the second subset of video samples as a target vector, and using the parameters of the current localization model and the parameters of each video sample in the second subset of video samples as a feature matrix.

9. The computer-implemented method of claim 7, wherein:

the parameters of each video sample in the second subset of video samples are associated with a histogram of confidence scores for the video sample; and the confidence scores for the video sample are generated by applying the current localization model to temporal segments of the video sample.

10. The computer-implemented method of claim 1, further comprising:

selecting, by the computer system based on the predicted performance improvement of the localization model, a subset of at least one unlabeled video sample from the set of unlabeled video samples; and causing, by the computer system, annotations to the subset of at least one unlabeled video sample, the annotations and the subset of at least one unlabeled video sample forming a subset of at least one labeled video sample, wherein retraining the localization model comprises retraining the localization model based on the set of labeled video samples, the first labeled video sample, and the subset of at least one labeled video sample.

11. The computer-implemented method of claim 1, further comprising:

selecting a plurality of unlabeled video samples based on the trainable selection function;

causing, by the computer system, annotations to the plurality of unlabeled video samples, the plurality of unlabeled video samples and the annotations forming a plurality of labeled video samples; and adding the plurality of labeled video samples to a temporal action localization dataset for training another temporal action localization model.

12. A system for training a localization model that identifies a temporal location of an action in a video stream, the system comprising:

means for training a selection function using a first set of labeled video samples;

means for training the localization model based on a second set of labeled video samples;

means for determining based on a trainable selection function, for each unlabeled video sample in a set of unlabeled video samples, a predicted performance improvement of the localization model associated with retraining the localization model using the unlabeled video sample in combination with the second set of labeled video samples;

means for selecting, based on the predicted performance improvement of the localization model for each unlabeled video sample in the set of unlabeled video samples, a first unlabeled video sample from the set of unlabeled video samples;

means for receiving an annotation to the first unlabeled video sample, the annotation and the first unlabeled video sample forming a first labeled video sample; and means for retraining the localization model based on the second set of labeled video samples and the first labeled video sample.

13. The system of claim 12, wherein:

the means for training the selection function comprises means for determining a performance prediction model that maps a video sample and a current localization model to a predicted performance improvement for the current localization model associated with retraining the current localization model based on the video sample; and the means for determining the predicted performance improvement of the localization model comprises means for determining the predicted performance improvement based on the performance prediction model.

14. The system of claim 13, wherein the means for determining the performance prediction model comprises:
means for splitting the first set of labeled video samples into a first subset of video samples and a second subset of video samples;
means for training the current localization model based on the first subset of video samples;
means for determining a performance of the current localization model on a set of test video samples;
means for retraining, for each video sample in the second subset of video samples, the current localization model based on the first subset of video samples and the video sample in the second subset, wherein a new localization model is generated upon completion of the retraining;
means for determining, for each video sample in the second subset of video samples, a performance of the new localization model on the set of test video samples; and
means for determining, for each video sample in the second subset of video samples, a performance improvement based on the performance of the new localization model and the performance of the current localization model; and
means for determining the performance prediction model based on parameters of the current localization model, parameters of each video sample in the second subset of video samples, and the performance improvement for each video sample in the second subset of video samples.

15. A computer-readable non-transitory storage medium storing computer-executable instructions for training a localization model that comprises a neural network and identifies a temporal location of an action in a video stream, wherein the instructions, when executed by one or more processing devices, cause the one or more processing devices to perform operations comprising:
training the localization model based on a set of labeled video samples;
for each unlabeled video sample in a set of unlabeled video samples, determining, based on a trainable selection function, a predicted performance improvement of the localization model associated with retraining the localization model using the unlabeled video sample in combination with the set of labeled video samples;
selecting, based on the predicted performance improvement of the localization model for each unlabeled video sample in the set of unlabeled video samples, a first unlabeled video sample from the set of unlabeled video samples;
receiving an annotation to the first unlabeled video sample, the annotation and the first unlabeled video sample forming a first labeled video sample; and
retraining the localization model based on the set of labeled video samples and the first labeled video sample.

16. The computer-readable non-transitory storage medium of claim 15, wherein training the localization model comprises, for each labeled video sample in the set of labeled video samples:
extracting feature vectors for a plurality of temporal segments in the labeled video sample;
selecting, based on the extracted feature vectors, a temporal segment that is estimated to be associated with an action;
classifying the action associated with the selected temporal segment; and
comparing the classified action and timing associated with the selected temporal segment with a label associated with the labeled video sample.

17. The computer-readable non-transitory storage medium of claim 15, wherein the operations further comprise:
training the trainable selection function based on a second set of labeled video samples.

18. The computer-readable non-transitory storage medium of claim 17, wherein:
training the trainable selection function comprises determining a performance prediction model that maps a video sample and a current localization model to a predicted performance improvement for the current localization model associated with retraining the current localization model based on the video sample; and
determining the predicted performance improvement of the localization model comprises determining the predicted performance improvement based on the performance prediction model.

19. The computer-readable non-transitory storage medium of claim 18, wherein determining the performance prediction model comprises:
splitting the second set of labeled video samples into a first subset of video samples and a second subset of video samples;
training the current localization model based on the first subset of video samples;
determining a performance of the current localization model on a set of test video samples;
for each video sample in the second subset of video samples,
retraining the current localization model based on the first subset of video samples and the video sample in the second subset, wherein a new localization model is generated upon completion of the retraining;
determining a performance of the new localization model on the set of test video samples; and
determining a performance improvement based on the performance of the new localization model and the performance of the current localization model; and
determining the performance prediction model based on parameters of the current localization model, parameters of each video sample in the second subset of video samples, and the performance improvement for each video sample in the second subset of video samples.

20. The computer-readable non-transitory storage medium of claim 19, wherein determining the performance prediction model comprises:
performing a regression learning process using the performance improvement for each video sample in the second subset of video samples as a target vector, and using the parameters of the current localization model and the parameters of each video sample in the second subset of video samples as a feature matrix.

* * * * *